United States Patent
Shimizu

(10) Patent No.: US 12,459,437 B2
(45) Date of Patent: Nov. 4, 2025

(54) IMAGE CORRECTION SYSTEM

(71) Applicant: DENSO CORPORATION, Kariya (JP)

(72) Inventor: Takashi Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 53 days.

(21) Appl. No.: 18/321,018

(22) Filed: May 22, 2023

(65) Prior Publication Data
US 2023/0382304 A1 Nov. 30, 2023

(30) Foreign Application Priority Data
May 30, 2022 (JP) .................... 2022-087952

(51) Int. Cl.
*B60R 1/22* (2022.01)
*B60R 1/29* (2022.01)

(52) U.S. Cl.
CPC ............ *B60R 1/22* (2022.01); *B60R 1/29* (2022.01); *B60R 2300/105* (2013.01); *B60R 2300/30* (2013.01); *B60R 2300/50* (2013.01)

(58) Field of Classification Search
CPC ....... B60R 1/22; B60R 1/29; B60R 2300/105; B60R 2300/30; B60R 2300/50
See application file for complete search history.

(56) References Cited

U.S. PATENT DOCUMENTS

| | | |
|---|---|---|
| 7,145,597 B1 | 12/2006 | Kinjo |
| 2007/0033999 A1 | 2/2007 | Bothe et al. |
| 2016/0033194 A1 | 2/2016 | Sumihiro et al. |
| 2016/0047587 A1 | 2/2016 | Sasaki et al. |
| 2016/0057394 A1 | 2/2016 | Marutani et al. |
| 2016/0182863 A1* | 6/2016 | Watanabe ............ B60R 1/28 348/148 |
| 2017/0364765 A1* | 12/2017 | Nakata ................ G06T 7/73 |
| 2018/0259242 A1 | 9/2018 | Sumihiro et al. |
| 2023/0096864 A1* | 3/2023 | Yamada ............... G06T 7/10 348/148 |
| 2023/0271555 A1* | 8/2023 | Niu ..................... B60R 1/00 |

FOREIGN PATENT DOCUMENTS

| | | |
|---|---|---|
| EP | 3349440 A1 | 7/2018 |
| JP | 2001-238177 A | 8/2001 |
| JP | 2002-074339 A | 3/2002 |
| JP | 2008-271417 A | 11/2008 |
| JP | 2009-220658 A | 10/2009 |
| JP | 2016-111585 A | 6/2016 |

OTHER PUBLICATIONS

Comtec Drive Recorder ZDR035, pp. 1-85.
Partial Translation (p. 20) of Comtec Drive Recorder ZDR035.

* cited by examiner

*Primary Examiner* — Girumsew Wendmagegn
(74) *Attorney, Agent, or Firm* — Harness, Dickey & Pierce, P.L.C.

(57) ABSTRACT

An image correction system, which is capable of transmitting data indicating an image captured by a vehicle-mounted camera to a display device via a vehicle device and an external device, is configured to: detect, with respect to a predetermined orientation, an inclination of a photographed image that indicates the image captured by the camera; and correct the detected inclination of the photographed image to a target orientation and generating a display image to be displayed on the display device.

23 Claims, 16 Drawing Sheets

FIG. 4
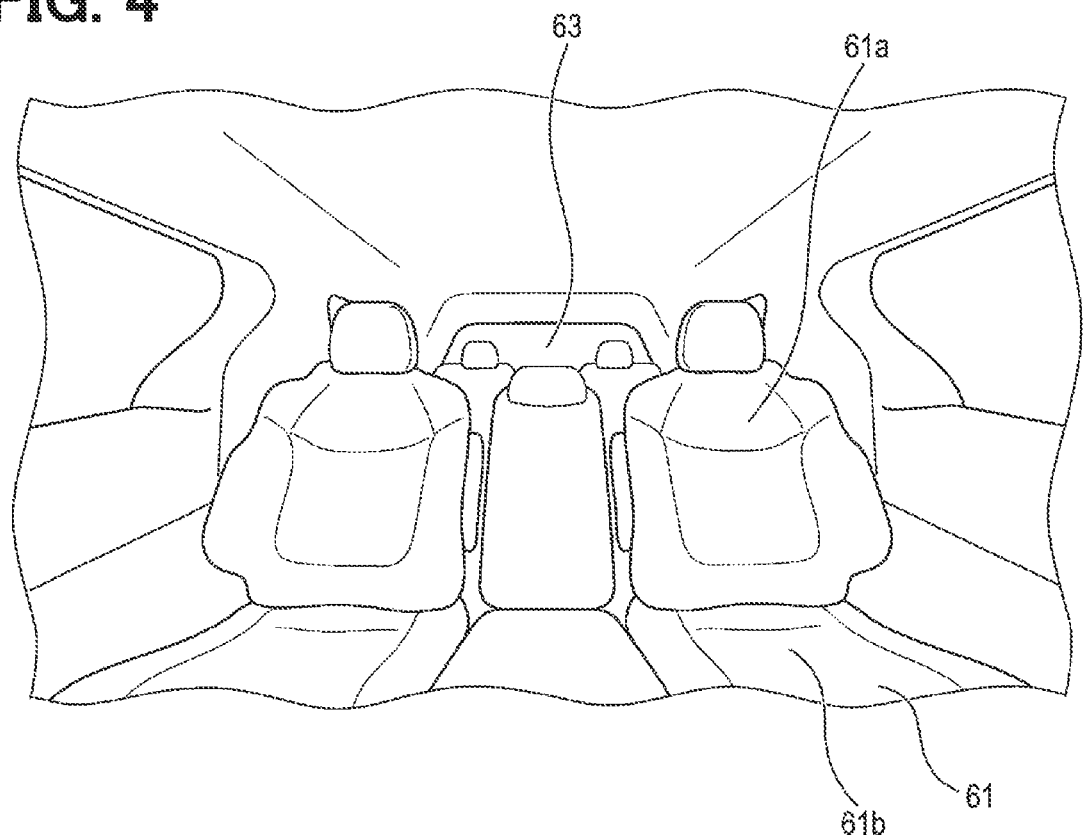
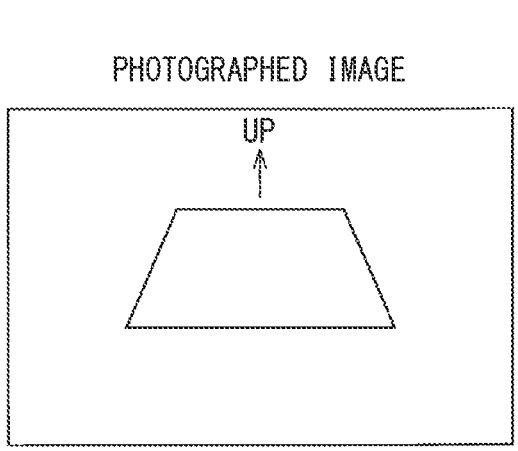
FIG. 5A
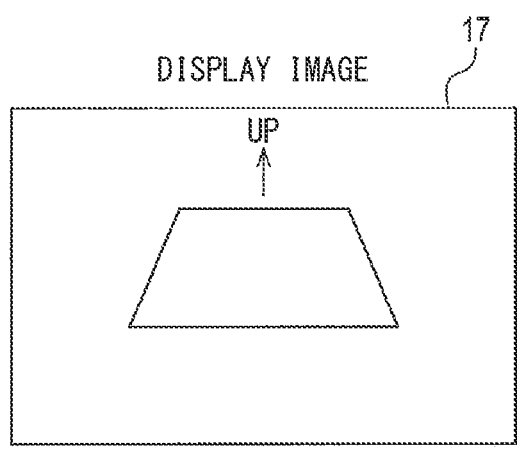
FIG. 5B

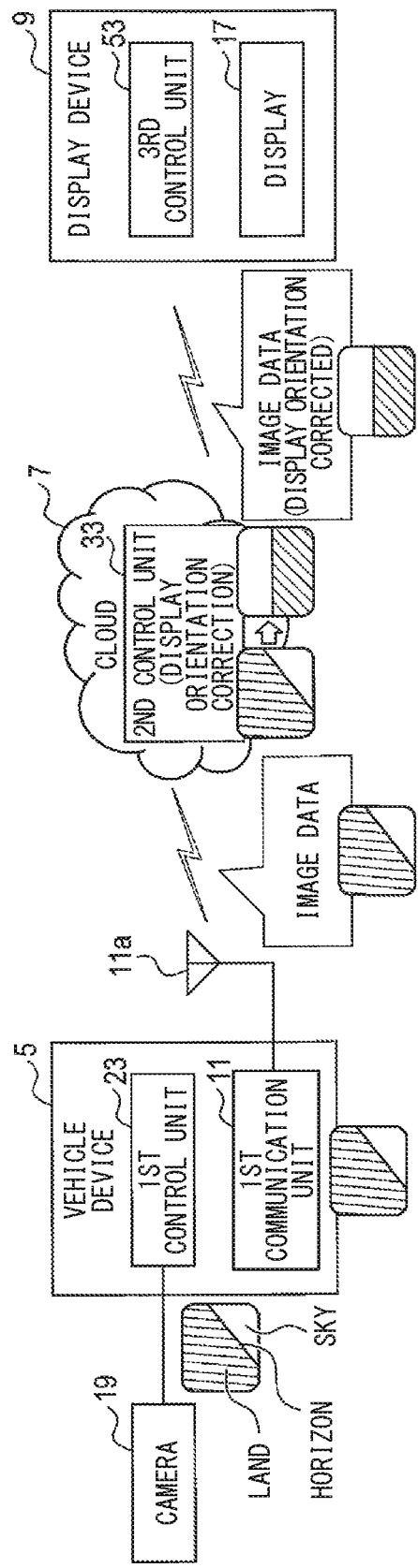

IMAGE CORRECTION SYSTEM

CROSS REFERENCE TO RELATED APPLICATION

The present application claims the benefit of priority from Japanese Patent Application No. 2022-087952 filed on May 30, 2022. The entire disclosure of the above application is incorporated herein by reference.

TECHNICAL FIELD

The present disclosure relates to a technology that corrects an image captured by a camera.

BACKGROUND

There has been known a technology in which periphery of a vehicle is photographed by a vehicle-mounted camera and data of the photographed image (i.e., image data) is recorded. The camera may include a lens disposed on a front portion of the camera (i.e., facing a target to be photographed) and a display disposed on a rear portion of the camera.

SUMMARY

The present disclosure provides an image correction system, which is capable of transmitting data indicating an image captured by a vehicle-mounted camera to a display device via a vehicle device and an external device. The image correction system detects, with respect to a predetermined orientation, an inclination of a photographed image that indicates the image captured by the camera, and corrects the detected inclination of the photographed image to a target orientation and generating a display image to be displayed on the display device.

BRIEF DESCRIPTION OF DRAWINGS

Objects, features and advantages of the present disclosure will become apparent from the following detailed description made with reference to the accompanying drawings. In the drawings:

FIG. 3 is an explanatory view illustrating coordinates of a camera, a vehicle, and the like;

FIG. 4 is an explanatory view schematically illustrating a photographed image in which the inside of a vehicle is photographed by a camera;

FIG. 5A is an explanatory view schematically illustrating a photographed image in a case where the camera is not inclined;

FIG. 5B is an explanatory view schematically illustrating a display image in a case where the camera is not inclined;

FIG. 10 is an explanatory view illustrating a procedure of processing in the image correction system of the first embodiment;

DETAILED DESCRIPTION

Figure 1:
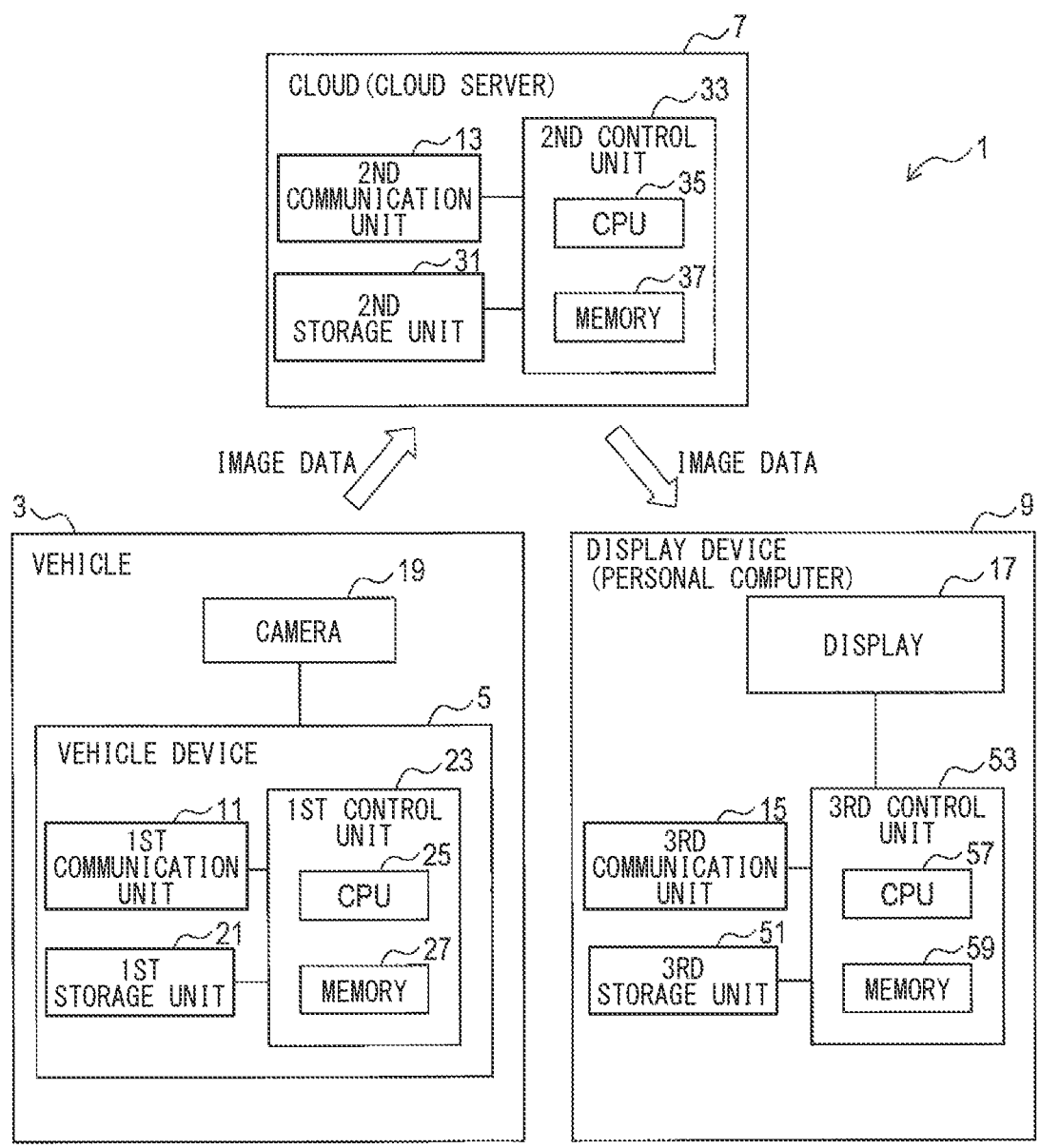
FIG. 1 is a block diagram illustrating an overall configuration of an image correction system of a first embodiment.

When mounting the above-described conventional camera to a vehicle, for example, the camera may be attached to a windshield or placed on a dashboard. Since an up-down of the camera is defined, an image displayed on the display (i.e., a display image) may be turned upside down between a case where the camera is attached to the windshield and a case where the camera is placed on the dashboard.

For example, in a case where a mounting part of the camera is attached to the windshield to hang the camera, suppose that the up-down of display image on the display disposed on the rear portion of the camera is correctly displayed. When the mounting part of the camera is fixed to the dashboard by reversing the up-down of the camera and camera body is positioned on the mounting part, the up-down of display image is displayed in reversed manner.

Also in a case where the camera is mounted in an inclined manner, the display image displayed on the display is also inclined due to the above-described reason. For the problem that the display image is turned upside down depending on mounting direction of the camera, there is a known a device that manually corrects the up-down of the display image by providing the camera with a switch for reversing the up-down of the display image. In addition, there is also known a device in which a G sensor is disposed in a camera. When an inclination of the camera (e.g., a mounting state related to the up-down of the camera) is detected, the up-down of display image on the display is adjusted (e.g., the display image is reversed) in accordance with the inclination of the camera.

The inventor of the present disclosure studied about the above-described conventional technology, and found some difficulties in the conventional technology. When the camera is provided with a switch for reversing the display image in up-down direction, a structure of the camera becomes complicated for additionally providing the up-down reverse function. In this configuration, a user is required to manually operate the switch. Thus, it takes time and effort to use the camera, which is inconvenient for the user.

In the configuration where the up-down of display image is switched using the G sensor, the G sensor is additionally required. Thus, the structure of the camera becomes complicated for additionally providing the G sensor. Furthermore, since the structure of camera becomes complicated, manufacturing cost is correspondingly increased.

Even in a case where a display is provided separately from the camera and the up-down of a display screen is switched on the display side, similar difficulties to the above-described difficulties exist.

According to an aspect of the present disclosure, an image correction system is provided. The image correction system is capable of transmitting data indicating an image captured by a camera to a display device via a vehicle device and an external device. the camera and the vehicle device are mounted to a vehicle, and the external device is disposed outside the vehicle. The image correction system includes: an inclination detection unit detecting, with respect to a predetermined orientation, an inclination of a photographed image that indicates the image captured by the camera; and a correction processing unit performing a correction by correcting the inclination of the photographed image, which is detected by the inclination detection unit, to a target orientation and generating a display image to be displayed on the display device.

According to another aspect of the present disclosure, a vehicle device is provided. The vehicle device is mounted to a vehicle, and the vehicle is also mounted with a camera. The vehicle device includes: a computer-readable non-transitory storage medium; and a computer that executes a program stored in the computer-readable non-transitory storage. The computer is configured to: detect, with respect to a predetermined orientation, an inclination of a photographed image that indicates an image captured by the camera; generate a display image to be displayed on a display device by correcting the detected inclination of the photographed image to a target orientation; and transmit, to an external device disposed outside the vehicle, the generated display image to be displayed on the display device.

According to another aspect of the present disclosure, a server device is provided. The server device is disposed outside of a vehicle, and communicates with a vehicle device mounted to the vehicle. The server device includes: a computer-readable non-transitory storage medium; and a computer that executes a program stored in the computer-readable non-transitory storage. The computer is configured to: receive, from the vehicle device, a photographed image captured by a camera mounted on the vehicle; detect, with respect to a predetermined orientation, an inclination of the photographed image; generate a display image to be displayed on a display device by correcting the detected inclination of the photographed image to a target orientation; and transmit the generated display image to the display device.

With the above-described configurations, it is possible to display the photographed image in target orientation, thereby improving user convenience. At the same time, since the correction of orientation is performed without using additional sensor, the present disclosure can suppress the structure of camera from becoming complicated.

In the present disclosure, for example, even in a case where the camera is inclined with respect to a vehicle and thus a photographed image captured by the camera is inclined with respect to a predetermined orientation (e.g., an upside orientation in the vehicle), the inclination can be corrected to match a target orientation (e.g., the upside orientation in the vehicle or a display device). Therefore, by displaying, on the display device, the corrected display image, it is possible to suppress a sense of discomfort, with the image, of a person who looks at the display device. For example, a display image, in which the upside of the vehicle is located upside, can be displayed on the display device, so that a sense of discomfort is less likely to occur.

In the present disclosure, the inclination of the photographed image is corrected using the photographed image itself as described above. Thus, it is possible to omit a switch or a G sensor for correcting the inclination of an image that is conventionally used. Therefore, remarkable effects can be obtained in which the structure of a camera can be simplified and user convenience is improved.

Note that an inclination detection unit may be provided in a vehicle device or an external device disposed outside of a vehicle. The vehicle device is a device mounted to the vehicle or equipped to the vehicle. Furthermore, a correction processing unit can be provided in a vehicle device, an external device disposed outside of a vehicle, or a display device.

Hereinafter, exemplary embodiments of the present disclosure will be described with reference to the drawings.

1. First Embodiment

In a first embodiment, an image correction system that corrects the inclination of an image captured by a camera mounted on a vehicle (e.g., an automobile) will be described as an example of a mobility IoT system. Herein, IoT is an abbreviation for Internet of Things.

1-1. Overall Configuration

First, an overall configuration of an image correction system 1 of the first embodiment will be described with reference to FIG. 1.

As illustrated in FIG. 1, the image correction system 1 includes a vehicle device 5 mounted on a vehicle 3, a cloud (i.e., a cloud server) 7, and a display device 9 capable of displaying an image.

Although only one vehicle device 5 is illustrated in FIG. 1 for convenience, the image correction system 1 may include, for example, a plurality of vehicle devices 5, and the plurality of vehicle devices 5 may be mounted on different vehicles 3, respectively.

The vehicle device 5 can wirelessly communicate with the cloud 7 via a first communication unit 11 on the vehicle 3 side. The vehicle device 5 can transmit data on an image or the like to the cloud 7. Note that detailed configurations of the vehicle 3 and the vehicle device 5 will be described later.

The cloud 7 can wirelessly communicate with the vehicle device 5 or the display device 9 via a second communication unit 13 on the cloud 7 side. The cloud 7 can collect data on an image or the like from the vehicle device 5, and can transmit the data on the image to the display device 9. A detailed configuration of the cloud 7 will be described later.

The display device 9 is a device capable of displaying an image (i.e., a display image). The display device 9 can wirelessly communicate with the cloud 7 via a third communication unit 15 on the display device 9 side. That is, the display device 9 can display an image (e.g., an image whose inclination has been corrected) on its own display 17 on the basis of the data on an image or the like transmitted from the cloud 7.

Examples of the display device 9 include a laptop having the display 17, a desktop type personal computer, and the display 17. Examples thereof also include a smartphone and a tablet terminal that are mobile terminals (i.e., information terminals). In the first embodiment, description will be made by mainly taking a laptop as an example, but the present disclosure is not limited thereto. Note that a detailed configuration of the display device 9 will be described later.

Hereinafter, each configuration will be described in detail.

1-2. Configuration on Vehicle Side

First, a configuration on the vehicle 3 side will be described with reference to FIG. 1.

As illustrated in FIG. 1, the vehicle 3 includes the vehicle device 5 and a camera 19. As described later, a display device (not illustrated) having a display capable of displaying an image may be provided inside the vehicle 3 (i.e., in the vehicle).

The camera 19 is used to photograph the inside of the vehicle or the outside thereof (e.g., a landscape or the like around the vehicle 3), and one or more cameras are disposed in the vehicle. As the camera 19, a digital camera, such as a CCD camera, can be adopted. As the image to be captured, a color image can be adopted.

Examples of the mounting position for the camera 19 include an upper portion of the windshield, the vicinity of the room mirror, the ceiling, and the top of the dashboard. When the inside of the vehicle is photographed, examples of the photographing range of the camera 19 include a range including a seat 61, a window 63, and a door (see FIG. 4).

(Vehicle Device)

Next, the vehicle device 5 will be described in detail.

The vehicle device 5 includes the first communication unit 11, a first storage unit 21, and a first control unit 23.

As described above, the first communication unit 11 can wirelessly transmit image data and the like to the cloud 7 via the second communication unit 13.

The first storage unit 21 is a storage capable of storing information. The first storage unit 21 can store, for example, information (i.e., image data) on an image captured by the camera 19 (i.e., a photographed image). Examples of the first storage unit 21 include a hard disk drive (i.e., a HDD) and a solid disk drive (i.e., an SSD).

The first control unit 23 includes a CPU 25 and a semiconductor memory (hereinafter, referred to as a memory 27) such as a RAM or a ROM. The first control unit 23 includes, for example, a microcomputer or the like.

Functions of the first control unit 23 are implemented by the CPU 25 executing programs stored in a non-transitory tangible recording medium (i.e., the memory 27). When the program is executed, a method corresponding to the program is executed.

Note that a method for implementing various functions of the first control unit 23 is not limited to software, and some or all of the elements may be implemented by using one or more pieces of hardware. For example, in a case where the above-described functions are implemented by an electronic circuit that is hardware, the electronic circuit may be implemented by a digital circuit including a large number of logic circuits, an analog circuit, or a combination thereof.

1-3. Configuration on Cloud Side

Next, a configuration on the cloud 7 side will be described with reference to FIGS. 1 and 2.

The cloud 7 includes the second communication unit 13, a second storage unit 31, and a second control unit 33.

The second communication unit 13 can perform wireless communication with the first communication unit 11 or the third communication unit 15. For example, the cloud 7 can receive image data and the like transmitted from the vehicle device 5 via the first communication unit 11 and the second communication unit 13, and can transmit image data and the like to the display device 9 via the second communication unit 13 and the third communication unit 15.

The second storage unit 31 is a storage that stores information similar to that in the first storage unit 21 of the vehicle device 5, and can store image data and the like on a photographed image captured by the camera 19.

The second control unit 33 includes a CPU 35 and a semiconductor memory (hereinafter, referred to as a memory 37 that is a non-transitory tangible recording medium) such as a RAM or a ROM. The configuration and functions of the second control unit 33 are basically similar to those of the first control unit 23 of the vehicle device 5, and are implemented by the CPU 35 executing programs stored in the memory 37. When the program is executed, a method corresponding to the program is executed.

The cloud 7 having the above-described configuration can collect data on the vehicle 3 transmitted from each of the plurality of vehicle devices 5 via the first communication unit 11. Furthermore, the cloud 7 can store, for each vehicle 3, the collected data in the second storage unit 31.

In addition, the cloud 7 generates a digital twin on the basis of the data on the vehicle 3 stored in the second storage unit 31. The digital twin is normalized index data.

In a case where the cloud 7 is connected to a service providing server (not illustrated), the data on the predetermined vehicle 3 stored in the second storage unit 31 can be acquired by using the index data acquired from the digital twin. The service providing server can determine a control content of the vehicle 3 and transmit an instruction corresponding to the control content to the cloud 7. Based on the instruction, the cloud 7 can transmit the control content to the vehicle 3.

(Functional Configuration of Second Control Unit of Cloud)

Here, a functional configuration of the second control unit 33 of the cloud 7 will be described.

Figure 2:
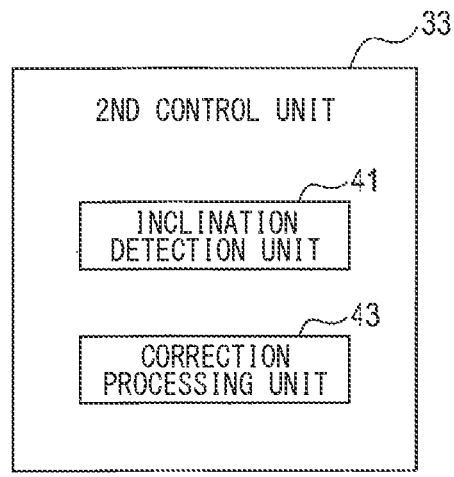
FIG. 2 is a block diagram functionally illustrating a second control unit of a cloud of the first embodiment.

As illustrated in FIG. 2, the second control unit 33 functionally includes an inclination detection unit 41 and a correction processing unit 43.

The inclination detection unit 41 is configured to detect, for a photographed image captured by the camera 19, an inclination (e.g., a rotation angle from an upside orientation in the up-down direction of the vehicle 3) with respect to a predetermined orientation (e.g., the upside orientation).

Note that, here, the "orientation" is an orientation in a direction such as the up-down direction or the Y-axis direction (e.g., an orientation such as the orientation of a vector or the orientation of an hour hand). Note that the "upside orientation" may be simply referred to as "heading upward".

The correction processing unit 43 is configured to correct, based on the inclination detected by the inclination detection unit 41, the inclination of the photographed image so as to be aligned with a target orientation (e.g., the orientation of the original photographed image in a case where the camera 19 is not inclined), and generate a display image to be displayed on the display device 9.

For example, the photographed image is corrected such that the upside of the photographed image is located on the upside of the vehicle 3 as in a case where the camera 19 is not inclined, whereby the display image is generated.

Therefore, the display 17 displays such that the upside of the vehicle 3 in the display image is located on the upside of the display 17, as described later.

1-4. Configuration of Display Device

Next, a configuration of the display device 9 will be described with reference to FIG. 1.

The display device 9 is, for example, a laptop, and includes the third communication unit 15, a third storage unit 51, a third control unit 53, and the display 17.

As described above, the third communication unit 15 can wirelessly receive image data and the like from the cloud 7 via the second communication unit 13.

The third storage unit 51 is a storage that stores information similar to that in the first storage unit 21 of the vehicle device 5, and can store the image data and the like transmitted from the cloud 7.

The third control unit 53 includes a CPU 57 and a semiconductor memory (hereinafter, referred to as a memory 59 that is a non-transitory tangible recording medium) such as a RAM or a ROM. The configuration and functions of the third control unit 53 are basically similar to those of the first control unit 23 of the vehicle device 5, and are implemented by the CPU 57 executing programs stored in the memory 59. When the program is executed, a method corresponding to the program is executed.

The display 17 is a portion (e.g., a liquid crystal display) that displays various images and the like in the display device 9. For example, based on the image data transmitted from the cloud 7, the display 17 can display a display image in which the inclination of the photographed image has been corrected.

The display 17 has, for example, a rectangular shape when viewed from the front. In a case where the display device 9 is used by being placed on a horizontal surface, one long side of the display 17 is an upper end portion, and the other long side is a lower end portion.

1-5. Method for Detecting and Correcting Inclination of Image

Next, a method for correcting the photographed image captured by the camera 19 and generating a display image that is an image whose corrected orientation is aligned with a target orientation (i.e., a correction method) will be described.

When the inside of the vehicle is photographed as will be described later in the first embodiment, the inclination of the photographed image is corrected such that the ceiling side of the vehicle 3 is located upside, and the display image is generated. Then, the display 17 displays such that the upside of the display image (i.e., the ceiling side of the vehicle 3) matches the upside of the display 17.

When the outside of the vehicle is photographed, the display image is generated by correcting the inclination of the photographed image such that the sky side of the landscape or the like is located upside. Then, the display 17 displays such that the upside of the display image (i.e., sky side) matches the upside of the display 17.

Figure 3:
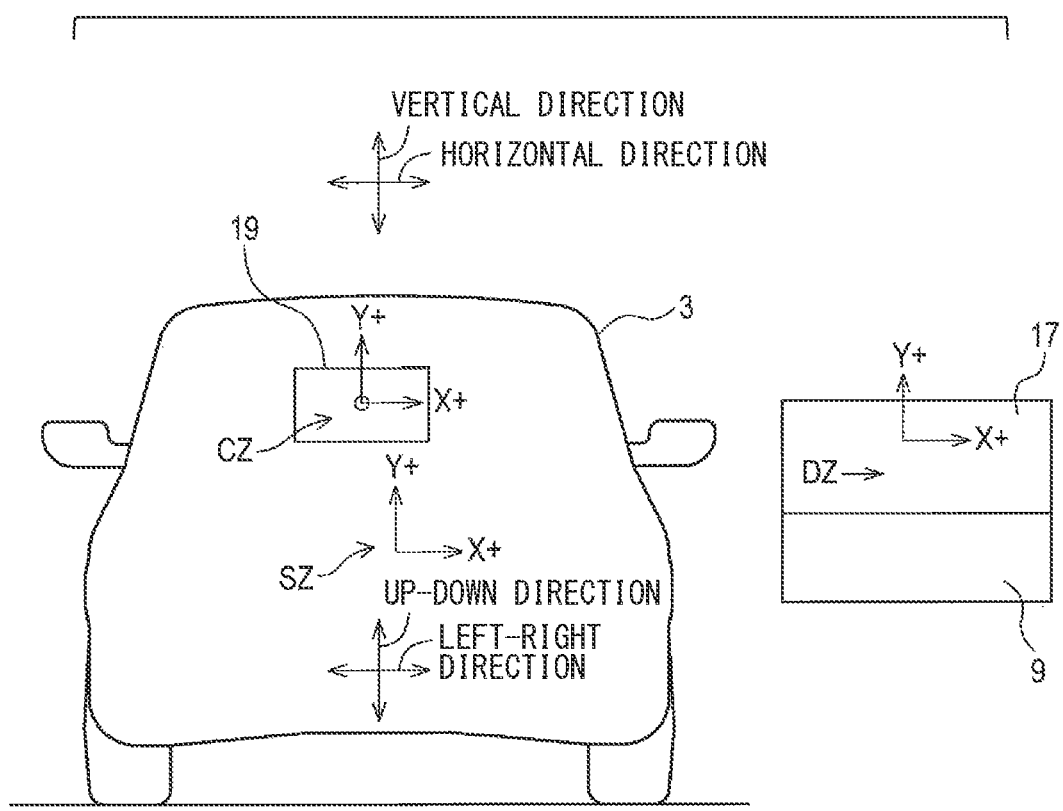

In the following, each orthogonal coordinate system, in which an X-axis, the Y-axis, and a Z-axis are orthogonal, will be taken as an example, as illustrated in FIG. 3.

For example, in a coordinate system SZ for the vehicle 3, the Y-axis indicates the up-down direction of the vehicle 3, the X-axis indicates the left-right direction when viewed from the front of the vehicle 3, and the Z-axis indicates the front-rear direction. Examples of the origin of the coordinate system SZ include the center of gravity of the vehicle 3.

In a coordinate system CZ for the camera 19, the Z-axis indicates the optical axis direction of the camera 19, the Y-axis indicates the up-down direction of the camera 19, and the X-axis indicates the left-right direction when viewed from the side opposite to the lens side of the camera 19 (e.g., inside side).

In a coordinate system DZ for the display 17, the Y-axis indicates the up-down direction (lateral direction) of the display 17, the X-axis indicates the left-right direction (longitudinal direction) of the display 17, and the Z-axis indicates a direction perpendicular to the display surface of the display 17.

Note that the + side in the X-axis direction is denoted by X+, the − side is denoted by X−, the + side in the Y-axis direction is denoted by Y+, the − side is denoted by Y−, the + side in the Z-axis direction is denoted by Z+, and the − side is denoted by Z−. Z+ is a direction toward the back side of the paper surface of FIG. 3, and Z− is a direction toward the front side of the paper surface.

In the first embodiment, a display image, in which, as described below, the inclination of the photographed image has been corrected, is displayed on the display 17, that is, a display image, in which the upside orientation (heading upward) in the vehicle 3, the landscape, or the like has been corrected to match the upward orientation (heading upward) of the display 17, is displayed.

That is, the up-down direction of the vehicle 3 or the up-down direction of the landscape or the like is the same as the up-down direction of the display 17, and thus description will be made by taking, as a target orientation, an orientation indicating the upside (i.e., heading upward) in the up-down direction as an example.

Since a plurality of correction methods are conceivable, various correction methods will be described below.

(Method for Correction on the Basis of Image in which Inside of Vehicle is Photographed)

Here, a case is taken as an example, where the camera 19 is attached to, for example, the windshield so as to photograph the inside of the vehicle.

The optical axis of the camera 19 (Y-axis direction of the coordinate system CZ) is parallel to the front-rear direction of the vehicle 3 (Y-axis direction of the coordinate system SZ). Note that, even in a case where the optical axis of the camera 19 is not parallel to the front-rear direction of the vehicle 3, it is possible from a correction principle to be described later to correct the inclination of the up-down or the like of the photographed image. Therefore, description will be made here by taking an easy-to-understand example.

Note that the up-down of the camera 19 and the up-down of the photographed image are the same, and the up-down of the camera 19 is determined in advance by the camera 19 itself, for example, depending on the arrangement of an image sensor that receives light, the coordinates of the image sensor, or the like.

First, a case where the heading upward (Y+), which is the upward orientation in the up-down direction of the camera 19, matches the heading upward (Y+), which is the upward orientation in the up-down direction of the vehicle 3, that is, a case where the camera 19 is not inclined when rotated about the optical axis, will be described.

In a case where the camera 19 is not inclined, when the inside of the vehicle is photographed by the camera 19, the up-down of a structural object in the vehicle, such as the seat 61 or the window 63, also match in an image (i.e., photographed image) in which they are photographed, as illustrated in FIG. 4. In the photographed image, for example, the upper end portion of a backrest 61a of the seat 61 is located on the upside, and a seat part 61b is located on the downside.

Therefore, the photographed image is displayed, as a display image, on the display 17 as it is. That is, the photographed image is displayed such that the up-down thereof matches the up-down of the display 17. In detail, the photographed image, in which the inside of the vehicle 3 is photographed, is displayed such that the upside of the vehicle 3 is located on the upside of the display 17 and the downside of the vehicle 3 is located on the downside of the display 17.

This will be described in detail with reference to FIGS. 5A and 5B. In FIGS. 5A and 5B, only the rear window 63 in the photographed image is schematically illustrated by a trapezoid in which the lower base of the trapezoid indicates a linear end portion (lower end) extending, on the downside of the window 63, in the left-right direction of the vehicle 3, and the upper base that is shorter than the lower base indicates a linear end portion (upper end) extending, on the upside of the window 63, in the left-right direction of the vehicle 3.

When the vehicle 3 is on a horizontal ground, the upper and lower ends of the window 63 are horizontal and perpendicular to the vertical direction indicating the up-down direction of the vehicle 3.

In a case where the camera 19 is not inclined with respect to the vehicle 3 when viewed from the front of the vehicle 3, the Y-axis direction and orientation (e.g., heading upward: Y+) of the camera 19 and the Y-axis direction and orientation (e.g., heading upward: Y+) of the vehicle 3 are the same directions and the same orientations, as illustrated in FIG. 3.

Therefore, when the photographed image (see FIG. 5A) captured by the camera 19 is displayed on the display 17, the up-down of the camera 19, the up-down of the vehicle 3, and the up-down of the display 17 match each other as illustrated in FIG. 5B, and thus the photographed image captured by the camera 19 is displayed as it is. That is, the up-down of the photographed image matches the up-down of the display image. In detail, the up-down of the trapezoidal window 63 in the photographed image matches the up-down of the trapezoidal window 63 in the display image.

On the other hand, in a case where the camera 19 is inclined with respect to the vehicle 3 when rotated about the optical axis and when viewed from the front of the vehicle 3 (see FIG. 6A), the orientation (e.g, heading upward) of the camera 19 differs from the orientation (e.g., heading upward) of the vehicle 3. Note that, when the camera 19 is rotated by 180 degrees about the optical axis, the Y-axis directions of the camera 19 and the vehicle 3 match each other, but the up-downs thereof are reversed, and thus the respective orientations (i.e., the upside of the camera 19 and the upside of the vehicle 3) are reversed.

Figure 6A:
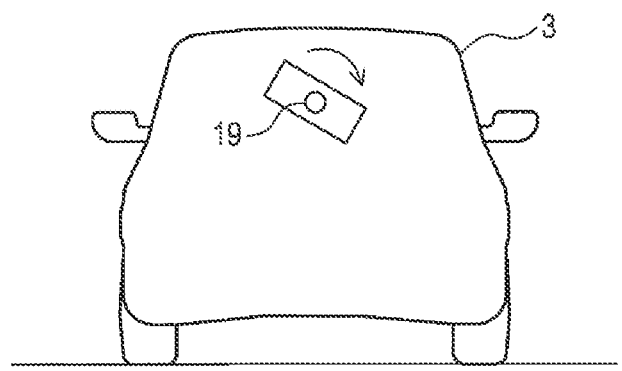
FIG. 6A is an explanatory view illustrating a state in which the camera is inclined with respect to the vehicle.

For example, when the Y-axis of the camera 19 is rotated to the right by a degrees (e.g., 45 degrees) when viewed from the front of the vehicle 3, as illustrated in FIG. 6A, the orientation (e.g., heading upward: Y+) of the camera 19 is also rotated to the right by, for example, 45 degrees.

Figure 6B:
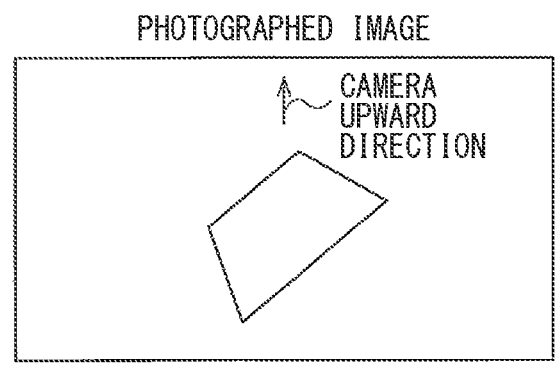
FIG. 6B is an explanatory view schematically illustrating a photographed image in a case where the camera is inclined.

When the inside of the vehicle is photographed by the camera 19 in this state, an image is obtained in which the structural objects in the vehicle are rotated in a direction opposite to the rotation direction of the camera 19. That is, the photographed image by the camera 19 is rotated to the left by 45 degrees (i.e., to the right by 315 degrees) and inclined, as illustrated in FIG. 6B. Note that the upward orientation (heading upward) of the camera 19 is the same as the upward orientation (heading upward) of the photographed image.

Figure 6C:
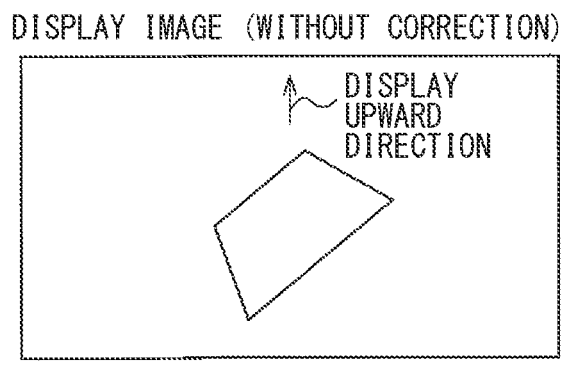
FIG. 6C is an explanatory view schematically illustrating a display image without being corrected in a case where the camera is inclined.

Therefore, when this photographed image is displayed on the display 17 as it is (i.e., without being corrected), it is displayed such that the upward orientation (i.e., heading upward) of the camera 19 matches the heading upward of the display 17. That is, it is displayed such that the heading upward of the photographed image matches the heading upward of the display image. That is, the structural objects in the vehicle are displayed in a state of being rotated to the left by 45 degrees and inclined as in the photographed image, as illustrated in FIG. 6C.

When they are displayed in this way, the orientation thereof in the image is usually not much thought of, and thus a person who looks at this image naturally feels a sense of discomfort. Therefore, in the first embodiment, the photographed image is corrected to not cause a sense of discomfort.

Figure 6D:
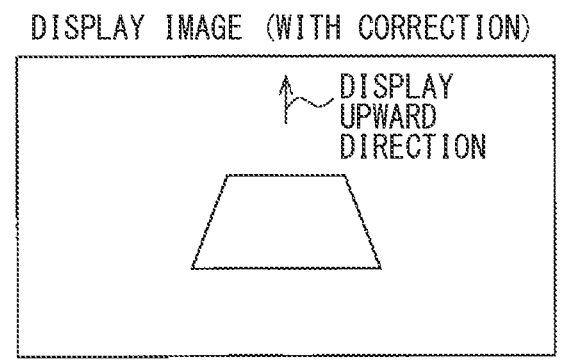
FIG. 6D is an explanatory view schematically illustrating a display image corrected in a case where the camera is inclined.

That is, the inclination of the photographed image caused by the inclination of the camera 19 is corrected such that the upside of a structural objects in the vehicle is located on the upside of the display 17 and the downside of the structural object is located on the downside of the display 17, as illustrated in FIG. 6D. That is, a display image is generated by correcting the photographed image to be rotated to the right by 45 degrees, and the display image obtained by this correction is displayed on the display 17.

In the first embodiment, a display image in which the inclination of the photographed image has been corrected, that is, a display image obtained by correcting such that the upward orientation (heading upward) in the vehicle 3 matches the upward orientation (heading upward) of the display 17, is displayed on the display 17, as described above.

Therefore, even if the camera 19 is inclined, an image, as in a case where the camera 19 is not inclined, can be displayed on the display 17. As a result, a sense of discomfort with the image displayed on the display 17 can be reduced, so that the image is very easy to look at.

Here, as the structural object in the vehicle used to correct the photographed image, for example, various structural objects, by which the left-right direction and up-down direction of the vehicle 3 can be recognized, can be adopted.

For example, the linear upper and lower ends of the window 63 on the rear side and the upper end of the backrest 61a of the seat 61 match the left-right direction of the vehicle 3, as described above, so that they can be used for recognizing the left-right direction of the vehicle 3. The up and down of the window 63 can also be determined from the difference in length between the upper and lower ends of the trapezoidal window 63 or from the inclinations of the left and right end portions of the trapezoid. In a case where there is a lamp at the center of the ceiling, it can be determined in the photographed image that the direction in which the lamp is present is the heading upward in the up-down direction.

(Method for Correction on the Basis of Image in Which Markers Disposed in Vehicle are Photographed)

Figure 7:
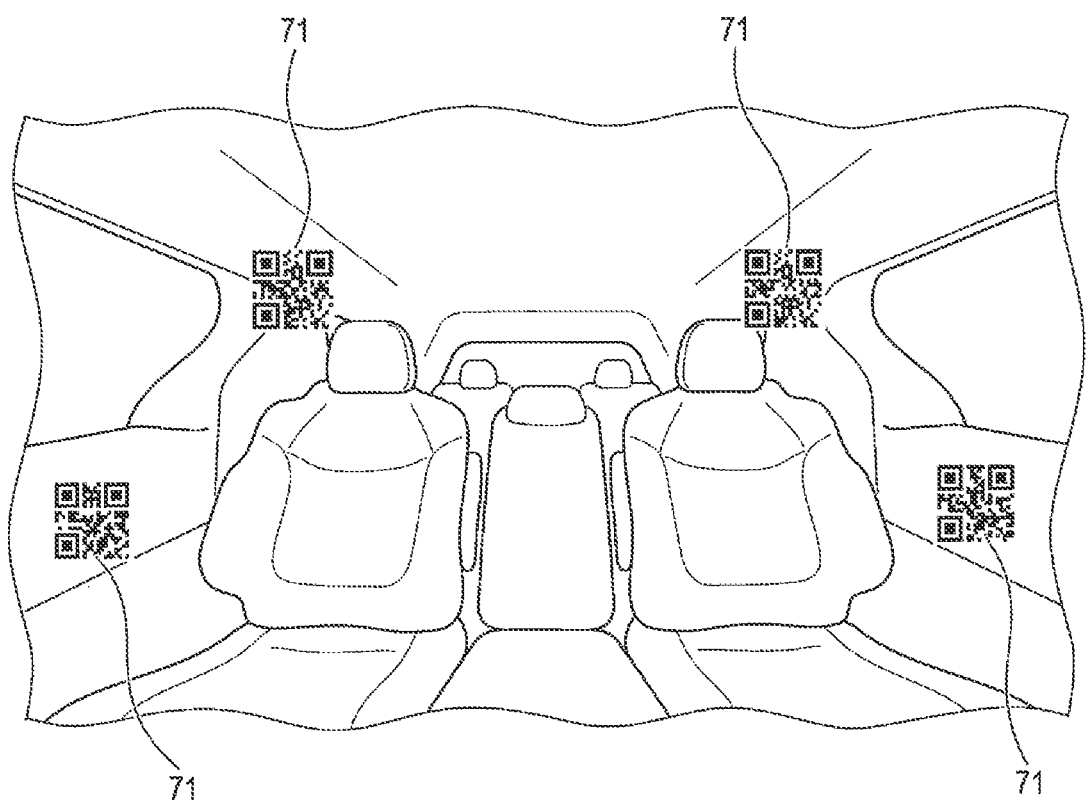
FIG. 7 is an explanatory view schematically illustrating a photographed image in which the inside of a vehicle with markers is photographed by a camera.

As illustrated in FIG. 7, when a marker 71 indicating a position in the vehicle is disposed in the vehicle, the inclination of the photographed image can be detected from the image of the marker 71.

Specifically, for example, markers 71 such as two-dimensional codes, each indicating positions thereof, are disposed on the left-right on the upside and the left-right on the downside in the vehicle, as illustrated in FIG. 7. Note that the line connecting the left and right markers 71 on the upside is parallel to the line connecting the left and right markers 71 on the downside. The left and right markers 71 are disposed in line symmetry with respect to the Y-axis of the coordinate system SZ for the vehicle 3.

Therefore, when the inside of the vehicle is photographed by the camera 19, the respective markers 71 are photographed, and thus the positions (i.e., an up-down position and a left-right position in the vehicle) of the respective markers 71 can be recognized from the image of the respective markers 71. That is, in addition to the up-down direction and left-right direction of the vehicle 3, the orientation in each direction can be grasped from the respective markers 71.

Furthermore, the upside of the vehicle 3 is known from the left and right markers 71 on the upside, and further the line connecting the left and right markers 71 indicates the left-right in the vehicle 3, and thus it is possible to grasp how much the camera 19 (accordingly, the photographed image) is inclined with respect to the vehicle 3 from the photographed image in which the markers 71 are photographed.

Therefore, the inclination of the photographed image can be detected, so that a display image whose orientation is correct can be displayed by correcting the inclination of the photographed image, as described above.

(Method for Correction on the Basis of Image in Which Landscape or the Like Outside Vehicle is Photographed)

The inclination of the camera 19 (accordingly, the photographed image) can be detected from a photographed image, in which a landscape or the like outside the vehicle is photographed, in the following manner. When a photographed image, in which a landscape or the like outside the vehicle is photographed, is used, an image is displayed on the display 17 such that the upside in the vertical direction of the landscape or the like (i.e., outside periphery of the vehicle) is located on the upside of the display 17, as will be described later.

Here, description will be made by taking a case, where the vehicle 3 is on a horizontal ground, as an example for ease of the description.

a) Use of Photographed Image in Which Building 65 in Front of Vehicle 3 is Photographed In a case where the camera 19 is not inclined with respect to the up-low direction (accordingly, the vertical direction) of the vehicle 3 when rotated about the optical axis, the up-down of the photographed image matches the up-down of the display 17 (i.e. up-down of the display image), similarly to FIGS. 5A and 5B.

Figure 8A:
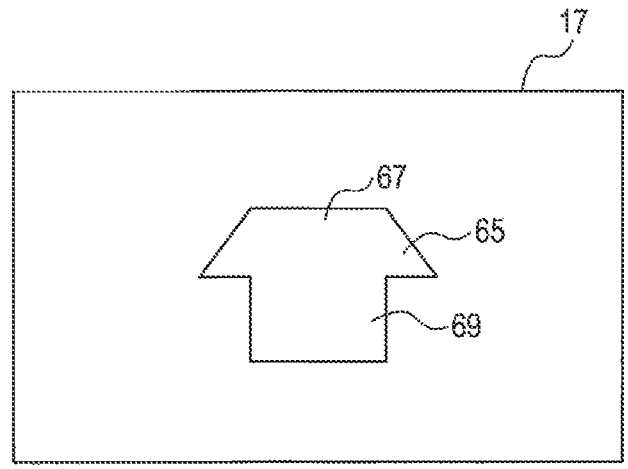
FIG. 8A is an explanatory view schematically illustrating a photographed image and a display image of a building in a case where the camera is not inclined.

Therefore, when the building 65 is photographed, a roof 67 of the building 65 is displayed above a side wall (i.e., outer wall) 69 in the photographed image and the display image, as illustrated in FIG. 8A, so that there is no sense of discomfort with the image displayed on the display 17.

On the other hand, in a case where the camera 19 is inclined, the building 65 is photographed in an inclined manner similarly to when the inside of the vehicle is photographed, and thus there is a sense of discomfort if the building is displayed on the display 17 as it is.

Figure 8B:
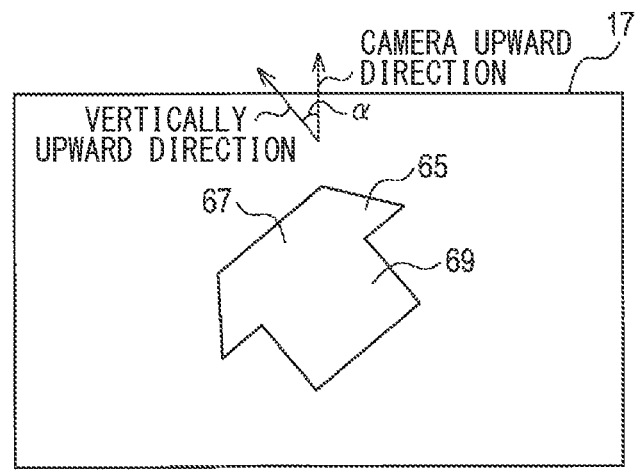
FIG. 8B is an explanatory view schematically illustrating a photographed image of a building in a case where the camera is inclined.

For example, in a case where the camera 19 is rotated about the optical axis, to the right by a degrees (e.g., 45 degrees) with respect to the heading upward in the up-down direction, an image rotated to the left by a degrees (e.g., an image in which the building 65 is inclined) is obtained as the photographed image, as illustrated in FIG. 8B. Therefore, it is necessary to correct the inclination of the photographed image.

Here, a case will be described, where processing, such as image recognition, is performed on the photographed image and it is detected that a photographed object is the building 65.

For example, in a case where the outer shape of an object is surrounded by lines including parallel straight lines and straight lines extending perpendicular to the parallel straight lines, that is, in a case where one side is surrounded by an outline like a projection, the object may be regarded as the building 65.

Therefore, assuming that the parallel straight lines constituting the building 65 are regarded as straight lines constituting the outer wall 69, the direction of the straight lines can be regarded as the vertical direction. In this case, by regarding the straight line extending perpendicular to the straight lines of the outer wall 69 as the upper end of the roof 67, the upside (heading upward) in the vertical direction can be detected. Therefore, by detecting the inclination of the straight line of the outer wall 69 with respect to the heading upward in the up-down direction in the photographed image, the inclination of the photographed image can be detected.

Therefore, the inclination of the photographed image is corrected such that the straight line of the outer wall 69 in the photographed image matches the original vertical direction. In detail, correction is performed such that the straight line of the outer wall 69 matches the up-down direction of the original camera 19 at a correct position (i.e., the up-down direction of the original photographed image) and the roof 67 is located on the upside in the vertical direction (i.e., the upside of the display screen).

Figure 9A:
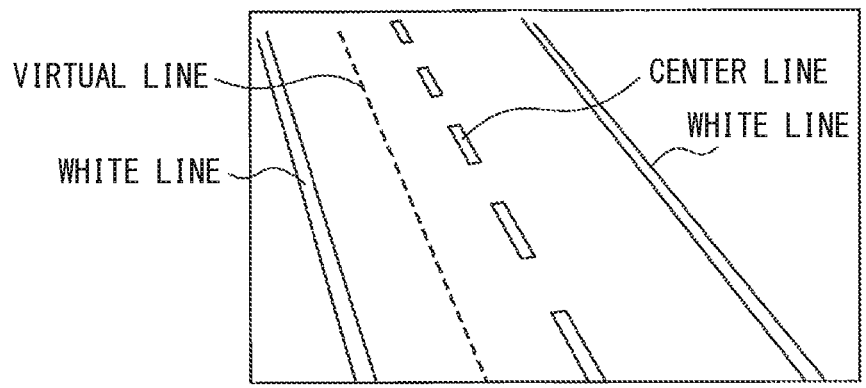
FIG. 9A is an explanatory view schematically illustrating a photographed image of a road in a case where the camera is inclined.

Specifically, when the photographed image is corrected by clockwise rotating by, for example, 45 degrees, it is possible to generate a display image with no up-down sense of discomfort (e.g., with the roof 67 side facing upward).

b) Use of Photographed Image in Which Road in Front of Vehicle 3 is Photographed In a case where a white line or the like extends straight on a road, as illustrated in FIG. 9A, the inclination of the photographed image can be detected by using the white line near the roadside, a center line, or the like.

For example, in the case of left-hand traffic, a central virtual line between the left white line and the center line is determined, and this virtual line is regarded as the front-rear direction of the vehicle 3 (accordingly, the up-down direction in the original photographed image) that is photographed from the position of the original camera 19 in a case where the camera 19 is not inclined.

Therefore, the inclination of the virtual line with respect to the up-down direction (e.g., heading upward) of the actual photographed image is detected as the inclination of the photographed image, and the photographed image is rotated and corrected such that the virtual line is aligned with the up-down direction. At this time, the correction is performed such that upper end side (i.e., the far side from the vehicle 3) of the virtual line is located on the upside of the photographed image.

Figure 9B:
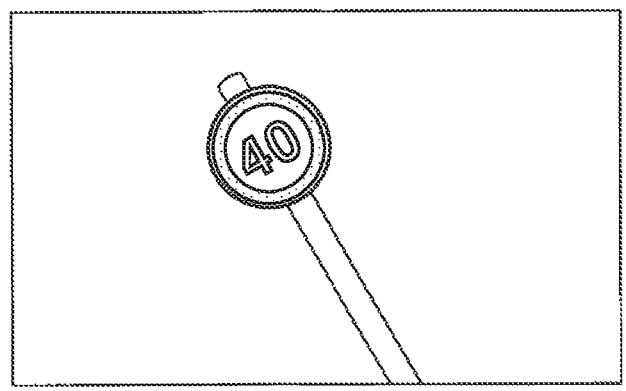
FIG. 9B is an explanatory view schematically illustrating a photographed image of a road sign in a case where the camera is inclined.

When there is a road sign in the photographed image, as illustrated in FIG. 9B, it is possible to recognize the vertical direction and the upside from the road sign by known image recognition.

That is, when characters and the like are recognized from the road sign, the upside in the vertical direction can be recognized, so that the inclination of the photographed image can be detected. Note that the vertical direction can be recognized from the prop of the road sign.

Even when there is a guardrail or the prop of a guardrail in the photographed image, the vertical direction and the upside (i.e., the upper side that is the sky side) can be recognized by known image recognition. That is, the prop extends along the vertical direction and the guardrail is disposed in the upper portion of the prop, and thus the vertical direction and the upside can be recognized. The same applies to a utility pole and the like.

Figure 9C:
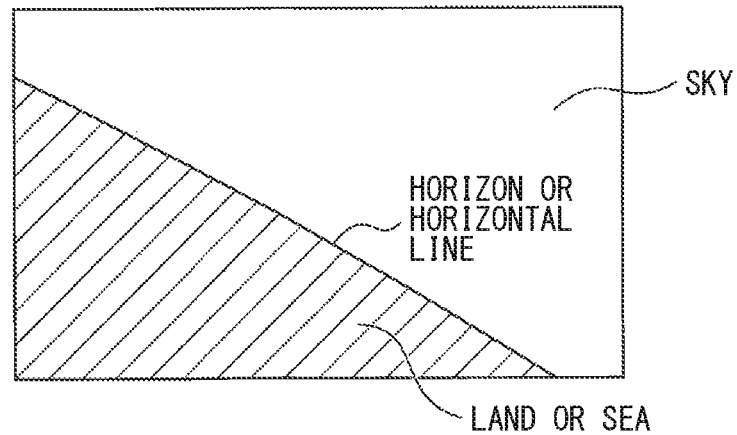
FIG. 9C is an explanatory view schematically illustrating a photographed image of a landscape in a case where the camera is inclined.

Therefore, by performing correction such that the inclination of the photographed image is eliminated based on the detected inclination, a display image can be generated.

c) Use of Photographed Image in Which Ground in Front of Vehicle 3 is Photographed When a straight line crossing a photographed image is recognized in the photographed image, for example, in the daytime by known image recognition and when one region divided by the straight line is bright and the other region (region indicated by oblique lines) is darker than the one region, as illustrated in FIG. 9C, the one region can be regarded as the sky and the other region can be regarded as a land or the sea.

When there is a road or the building 65 in the other region, it can be regarded as a land, while when there is a curved line that is regarded as a coastline, it can be regarded as the sea.

In such a case, the straight line can be regarded as a horizon or a horizontal line, so that the inclination of the photographed image can be detected by using the horizon or the horizontal line.

For example, by regarding a line orthogonal to the horizontal line as a line in the vertical direction, it is possible to detect how much the line in the vertical direction is inclined with respect to the up-down direction of the photographed image. In this case, correction is performed such that the sky side is located on the upside in the vertical direction.

Therefore, by performing correction such that the inclination of the photographed image is eliminated based on the detected inclination, a display image can be generated.

Note that, when an image, in which the outside of the vehicle is photographed, is used, the up-down of the photographed image is corrected even when the ground is inclined with respect to a horizontal plane (e.g., even when the left-right of the vehicle 3 is inclined), so that a display image whose up-down direction is correct (i.e., a display image in which the sky side is displayed on the upside of the display 17) can be displayed on the display 17.

1-6. Procedure of Overall Processing

Next, a procedure of overall processing in the image correction system 1 of the first embodiment will be described with reference to FIG. 10. Note that, of the configuration illustrated in FIG. 1, selected main parts are illustrated in FIG. 10.

In the first embodiment, processing for detecting the inclination of the photographed image and processing for correcting the inclination of the photographed image are performed by the cloud 7.

In the first embodiment, data on an image (i.e., a photographed image) captured by the camera 19 is transmitted from the vehicle device 5 to the cloud 7, as illustrated in FIG. 10. Next, the cloud 7 corrects the photographed image (i.e., corrects the inclination) to generate a display image. Next, data on the display image is transmitted to the display device 9, and the display 17 of the display device 9 displays the display image.

Details will be described below.

As illustrated in FIG. 10, for example, the outside of the vehicle 3 (e.g., the front of the vehicle 3) or the inside of the vehicle is photographed by the camera 19. Here, description will be made by taking the photographed image, in which a landscape outside the vehicle is photographed, as an example. For this photographed image, an image, in which a land in an oblique line portion, the white sky, and a horizon are photographed, is taken as an example.

Note that the photographed image illustrated in FIG. 10 may be an image in which the rear of the inside of the vehicle is photographed. In this case, an image, in which a rear door indicated by oblique lines, the white window of the door, and the line at the lower end of the window are photographed, may be used.

Here, a case will be described, where the vehicle 3 is located on a horizontal plane (hereinafter, the same applies to other embodiments). Note that, in a case where the ground is inclined, the photographed image, in which the outside of the vehicle is photographed, is inclined even if the camera 19 is not inclined with respect to the vehicle 3. That is, in a case where the camera 19 is inclined with respect to a landscape or the like outside the vehicle, an image whose up-down is not correct is obtained (hereinafter, the same applies to other embodiments). Also in this case, however, processing for recognizing the up-down of the photographed image is performed, so that it is possible to obtain, as an image in which the outside of the vehicle is photographed, a display image that has correct up-down and has a less sense of discomfort from the photographed image in which the landscape or the like outside the vehicle is inclined.

On the other hand, when a photographed image, in which the inside of the vehicle is photographed, is used, and when the camera 19 is inclined with respect to the vehicle 3, processing for recognizing the up-down of the photographed image is performed in the same manner as described above, regardless of the inclination of the ground. Therefore, even from a photographed image inclined in the vehicle, a display image, having correct up-down and having a less sense of discomfort, can be obtained as an image in which the inside of the vehicle is photographed.

First, in a case where the camera 19 is attached to be inclined with respect to the vehicle 3, a photographed image captured by the camera 19 (i.e., the image at the left end) also becomes an image in which the up-down of each of the sky and the land is not correct, as illustrated in FIG. 10. That is, a photographed image whose up-down direction is not correct is obtained. Note that, in the following description, the up-down direction indicates a direction in which it is known which is the up and which is the down, and the correct up-down direction indicates a direction having correct heading upward and correct heading downward.

Note that the image at the left end in FIG. 10 displays a photographed image rotated to the right by 135 degrees with respect to an original photographed image whose up-down direction is correct (i.e., a photographed image in a case where the camera 19 is not inclined).

Next, image data on the photographed image captured by the camera 19 is sent to the first control unit 23 of the vehicle device 5, and is transmitted from an antenna 11a of the first communication unit 11 to the cloud 7.

Next, the image data transmitted to the cloud 7 is sent to the second control unit 33, and a display orientation is corrected. That is, the inclination of the display image whose up-down direction is not correct is corrected, and a display image whose up-down direction is correct is generated. For example, the photographed image rotated to the right by 135 degrees is rotated to the left by 135 degrees. As a result, an image is obtained in which the sky is located on the upside, the land is located on the downside, and the horizon is horizontal (i.e., it matches the left-right direction of the display image).

Next, data on the image whose display orientation has been corrected (i.e., image data on the display image) is transmitted from the cloud 7 to the display device 9. This image data is sent to the third control unit 53, and is displayed on the display 17 by being processed by the third control unit 53.

As a result, a display image, in which the inclination of the photographed image has been corrected and which has a correct up-down direction, is displayed on the display 17. That is, a display image in which the sky is located on the upside, the land is located on the downside, and the horizon is horizontal (i.e., a display image in which the horizon matches the left-right direction of the display image) is displayed on the display 17, as illustrated in the image at the right end in FIG. 10.

1-7. Control Processing

Next, control processing to be performed in the image correction system 1 will be described with reference to FIG. 11. Note that, for example, when the outside of the vehicle is photographed, the present control processing may be always performed after the vehicle 3 is started. When the inside of the vehicle is photographed, the control processing may be performed at least once after the vehicle 3 is started (e.g, when the ignition switch is turned on for the start).

Figure 11:
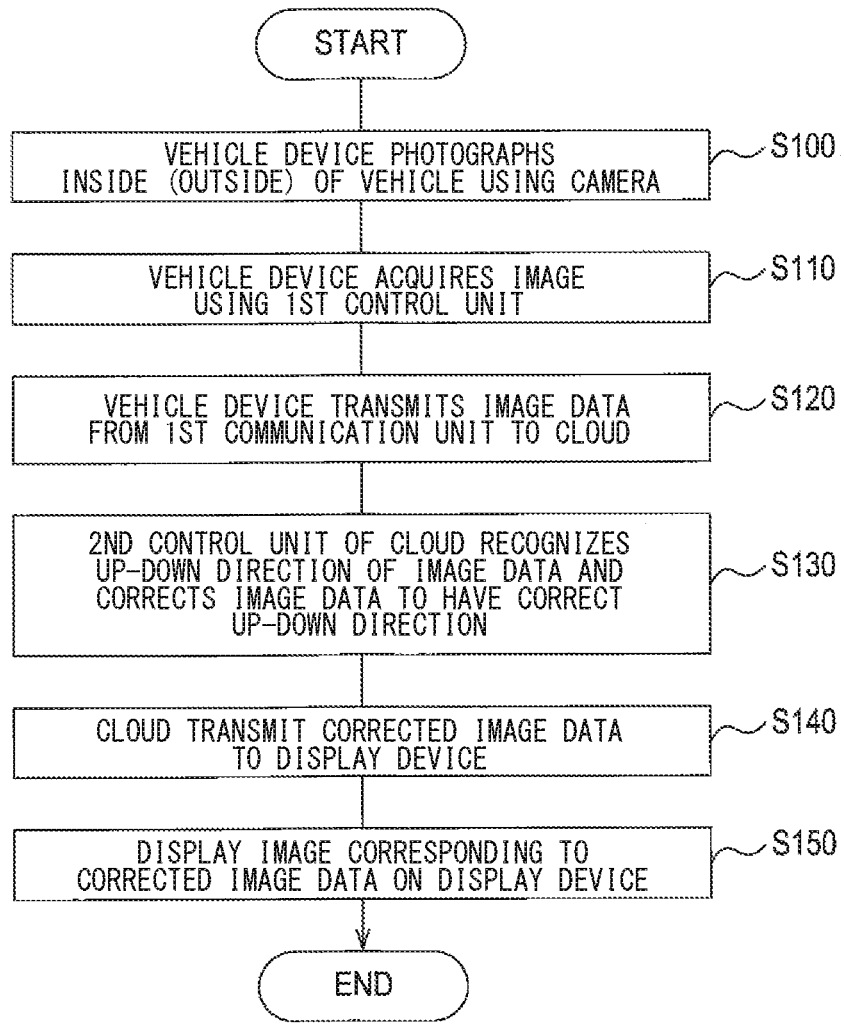
FIG. 11 is a flowchart showing control processing in the image correction system of the first embodiment.

In S100 in FIG. 11, the vehicle device 5 photographs the outside (or the inside) of the vehicle by the camera 19.

In subsequent S110, the vehicle device 5 fetches the image captured by the camera 19 (i.e., a photographed image) into the first control unit 23.

In subsequent S120, the vehicle device 5 transmits the image data on the photographed image from the first communication unit 11 to the cloud 7.

In subsequent S130, the second control unit 33 of the cloud 7 recognizes the inclination (i.e., the up-down direction) of the image data and corrects the image data to have a correct up-down direction.

Here, the correct up-down direction also includes a meaning indicating which of the up-down direction is located on the upside and which is located on the downside, as described above. For example, when an image, in which the outside of the vehicle is photographed, is used, the correct up-down direction indicates the up and down of the vertical direction, while when an image, in which the inside of the vehicle is photographed, is used, it indicates the up and down of the up-down direction of the vehicle 3. Therefore, the corrected image is displayed on the display 17 such that the up-down direction of the image matches the up-down direction of the display 17.

In subsequent S140, the cloud 7 transmits the corrected image data (i.e., image data on the display image) to the display device 9.

In subsequent S150, an image (i.e., the display image) based on the corrected image data is displayed on the display 17, and the present processing is temporarily ended.

1-8. Effects

According to the first embodiment, the following effects can be obtained.

(1a) In the first embodiment, the inclination of a photographed image captured by the camera 19 with respect to, for example, the up-down direction (e.g., heading upward) of the vehicle 3 is detected, the photographed image is corrected to have a correct up-down direction, and the corrected display image is displayed on the display 17 of the display device 9.

As a result, even when the photographed image captured by the camera 19 is inclined with respect to the up-down direction (e.g., heading upward) of the vehicle 3 because, for example, the camera 19 is inclined with respect to the vehicle 3, the inclination can be corrected to match a target direction (e.g., the upside orientation of the vehicle 3 or the display 17).

Therefore, by displaying the display image obtained by such correction on the display 17, it is possible to suppress a sense of discomfort with the image to a person who looks at the display 17. That is, a display image whose up-down direction is correct, in which the upside of the vehicle 3 is located upward, can be displayed on the display 17, so that a sense of discomfort is less likely to occur.

In addition, even in a case where the camera 19 is inclined with respect to a landscape outside the vehicle, correction can also be performed similarly, that is, correction can be performed such that the sky side is located upside and the land side or the sea side is located downside, so that a sense of discomfort with the display image can be reduced.

(1b) In the first embodiment, the inclination of a photographed image is further corrected as described above, and thus it is possible to omit a switch or a G sensor for correcting the inclination of an image that has conventionally been used. Therefore, remarkable effects can be obtained in which the structure of the camera 19 can be simplified and convenience of a user is improved.

(1c) Examples of the photographed image captured by the camera 19 include an image in which a structural object or the marker 71 inside the vehicle is photographed and an image in which a landscape or the like outside the vehicle (i.e., periphery of the vehicle) is photographed. That is, the inclination of the photographed image can be corrected based on a photographed image in which the seat 61, the window 63, or the marker 71 inside the vehicle is photographed, or a photographed image in which the building 65, a road, a sign, a landscape, or the like outside the vehicle is photographed.

(1d) The detection and correction of the inclination of the photographed image can be performed by the cloud 7, but may be performed by the vehicle device 5 as described later.

1-9. Correspondence

Next, a relationship between the first embodiment and the present disclosure will be described.

The image correction system 1 corresponds to the image correction system, the vehicle 3 corresponds to the vehicle, the vehicle device 5 corresponds to the vehicle device, the cloud 7 corresponds to the cloud, the display device 9 corresponds to the display device, the camera 19 corresponds to the camera, the inclination detection unit 41 corresponds to the inclination detection unit, and the correction processing unit 43 corresponds to the correction processing unit.

2. Second Embodiment

Next, a second embodiment will be described. Since the basic configuration of the second embodiment is similar to that of the first embodiment, differences from the first embodiment will be mainly described below. Note that the same reference numerals as those in the first embodiment indicate the same configurations, and reference is made to the preceding description.

Since the hardware configuration of the image correction system 1 of the second embodiment is the same as that of the first embodiment, the description thereof will be omitted.

In the second embodiment, processing for detecting the inclination of a photographed image and processing for correcting the inclination of the photographed image are performed by the vehicle device 5.

2-1. Procedure of Processing

Figure 12:
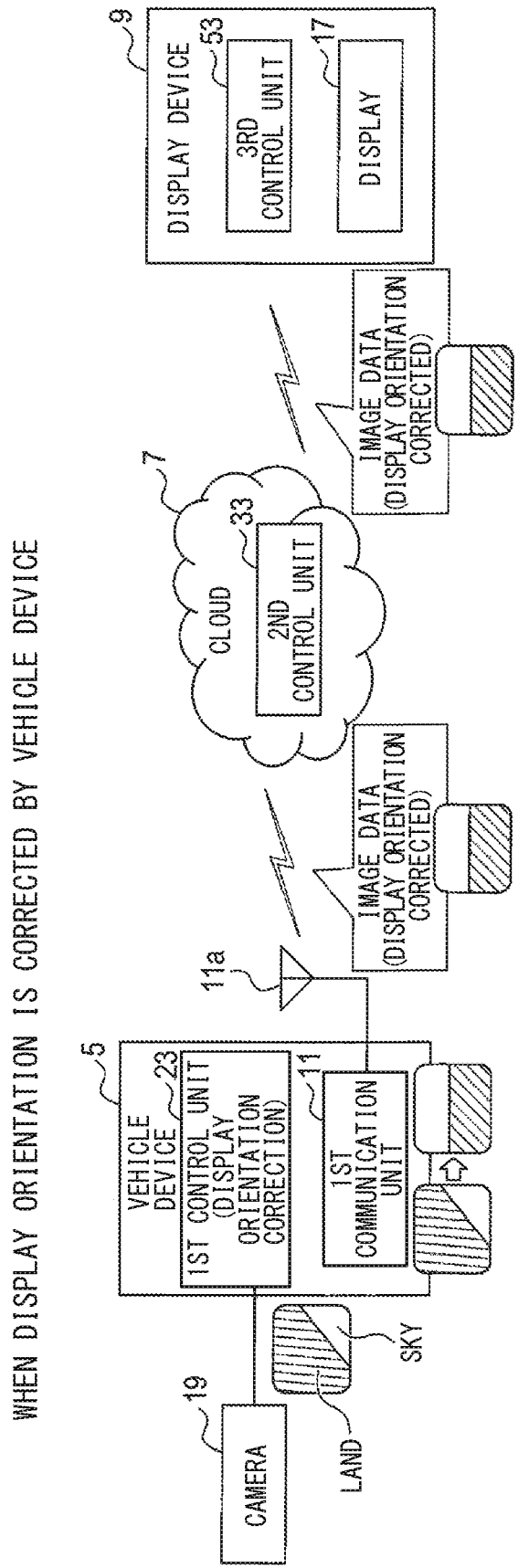
FIG. 12 is an explanatory view illustrating a procedure of processing in an image correction system of a second embodiment.

As illustrated in FIG. 12, the outside or inside of the vehicle is photographed by the camera 19. Here, description will be made by taking a photographed image, in which a landscape outside the vehicle is photographed, as an example.

In a case where the camera 19 is attached, for example, to be inclined with respect to the vehicle 3 on the horizontal ground, a photographed image captured by the camera 19 is also an image in which the up-down of each of the sky and the land is not correct, as illustrated in the image at the left end in FIG. 12.

Also in a case where the camera 19 is inclined with respect to a landscape or the like outside the vehicle, an image is obtained in which the up-down is not correct, as described above.

Next, image data on the photographed image captured by the camera 19 is sent to the first control unit 23 of the vehicle device 5, and a display orientation is corrected. That is, the inclination of the display image whose up-down direction is not correct is corrected, and a display image whose up-down direction is correct is generated.

Next, data on the image whose display orientation has been corrected (i.e., image data on the display image) is transmitted from the first communication unit 11 of the vehicle device 5 to the cloud 7.

Next, the data on the image whose display orientation has been corrected is transmitted from the cloud 7 to the display device 9. This image data is displayed on the display 17 by being processed by the third control unit 53.

As a result, a display image, in which the inclination of the photographed image has been corrected and which has a correct up-down direction, is displayed on the display 17.

2-2. Control Processing

Next, control processing in the second embodiment will be described with reference to FIG. 13.

Figure 13:
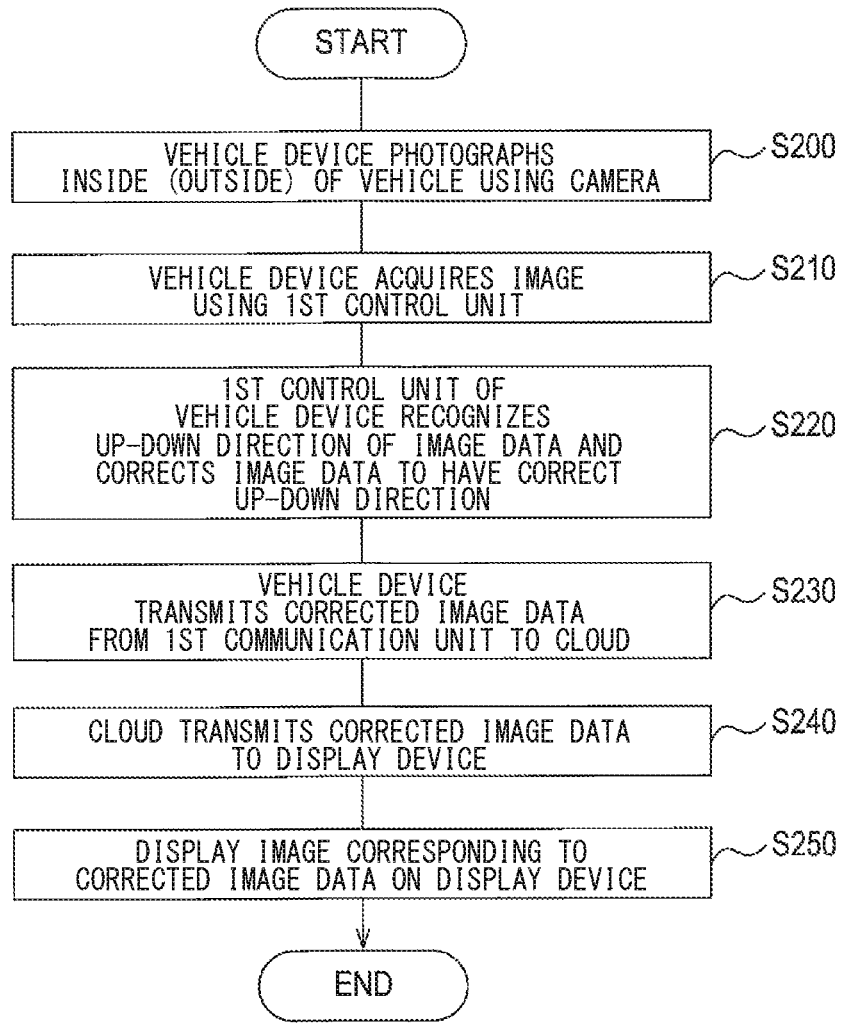
FIG. 13 is a flowchart showing control processing in the image correction system of the second embodiment.

In S200 in FIG. 13, the vehicle device 5 photographs the outside (or the inside) of the vehicle by the camera 19.

In subsequent S210, the vehicle device 5 fetches the image (photographed image) captured by the camera 19 into the first control unit 23.

In subsequent S220, the first control unit 23 recognizes the inclination (i.e., up-down direction) of the image data and corrects the image data to have a correct up-down direction.

In subsequent S230, the vehicle device 5 transmits the corrected image data from the first communication unit 11 to the cloud 7.

In subsequent S240, the cloud 7 transmits the corrected image data to the display device 9.

In subsequent S250, an image (i.e., a display image) based on the corrected image data is displayed on the display 17, and the present processing is temporarily ended.

In the second embodiment, the same effects as those in the first embodiment are obtained.

3. Third Embodiment

Next, a third embodiment will be described. Since the basic configuration of the third embodiment is similar to that of the first embodiment, differences from the first embodiment will be mainly described below. Note that the same reference numerals as those in the first embodiment indicate the same configurations, and reference is made to the preceding description.

Since the hardware configuration of the image correction system 1 of the third embodiment is the same as that of the first embodiment, the description thereof will be omitted.

In the third embodiment, processing for detecting the inclination of a photographed image to assign a vector is performed by the cloud 7, and processing for correcting the inclination of the photographed image is performed by the display device 9.

3-1. Procedure of Processing

Figure 14:
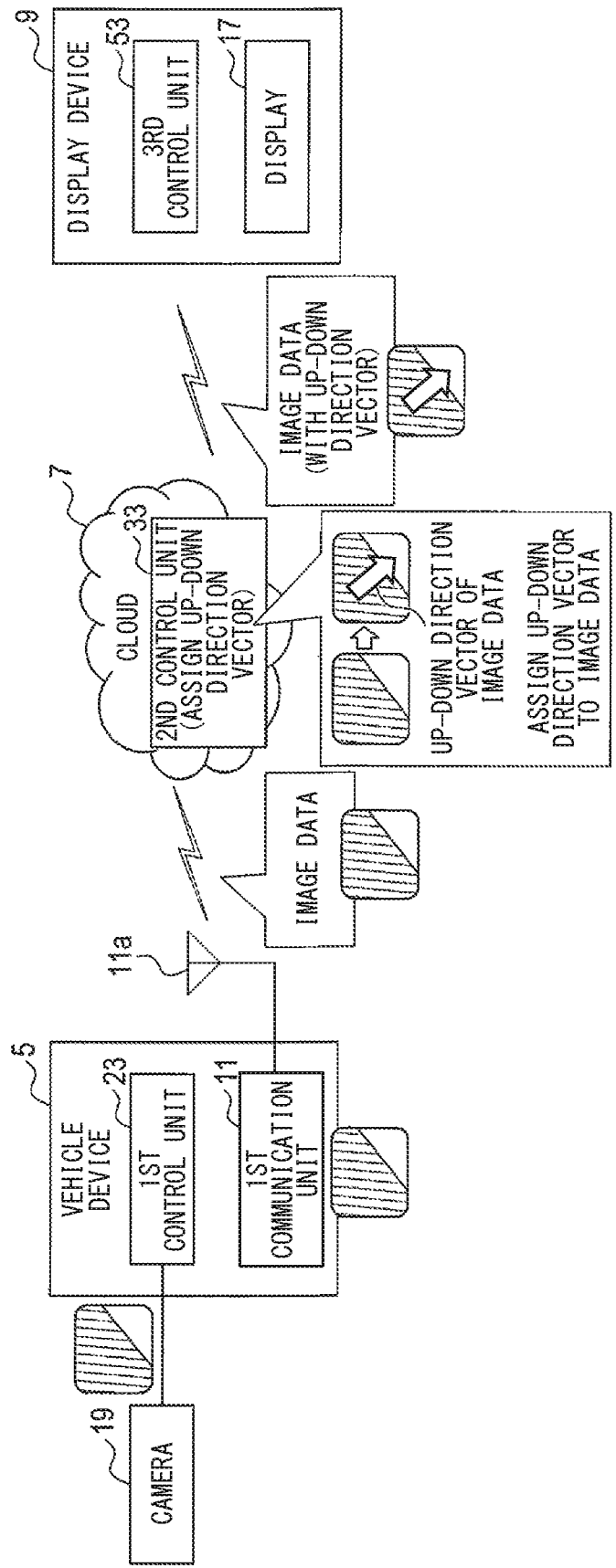
FIG. 14 is an explanatory view illustrating a procedure of processing in an image correction system of a third embodiment.

As illustrated in FIG. 14, the outside or inside of the vehicle is photographed by the camera 19. Here, description will be made by taking a photographed image, in which a landscape outside the vehicle is photographed, as an example.

Image data on the photographed image captured by the camera 19 is transmitted to the first control unit 23 of the vehicle device 5, and is transmitted from the antenna 11a of the first communication unit 11 to the cloud 7.

Next, in the cloud 7, the second control unit 33 assigns an up-down direction vector V1 to the image data. The up-down direction vector V1 is a vector that indicates how much an image is inclined with respect to, for example, the up-down direction (e.g., heading upward) of the vehicle 3, and examples thereof include a unit vector indicated by coordinates of (x, y). Note that examples of the origin of the coordinates include a center formed by the up-down and left-right of the photographed image.

In addition to the up-down direction vector V1, rotation angle data, indicating how much an image is rotated from the up-down direction (e.g., heading upward), may be assigned.

Next, the image data, to which data on the up-down direction vector V1 has been assigned, is transmitted from the cloud 7 to the display device 9.

Next, in the display device 9, the third control unit 53 corrects the image data on the photographed image on the basis of the up-down direction vector V1, generates a display image whose up-down direction is correct, and displays the image on the display 17.

Figure 15:
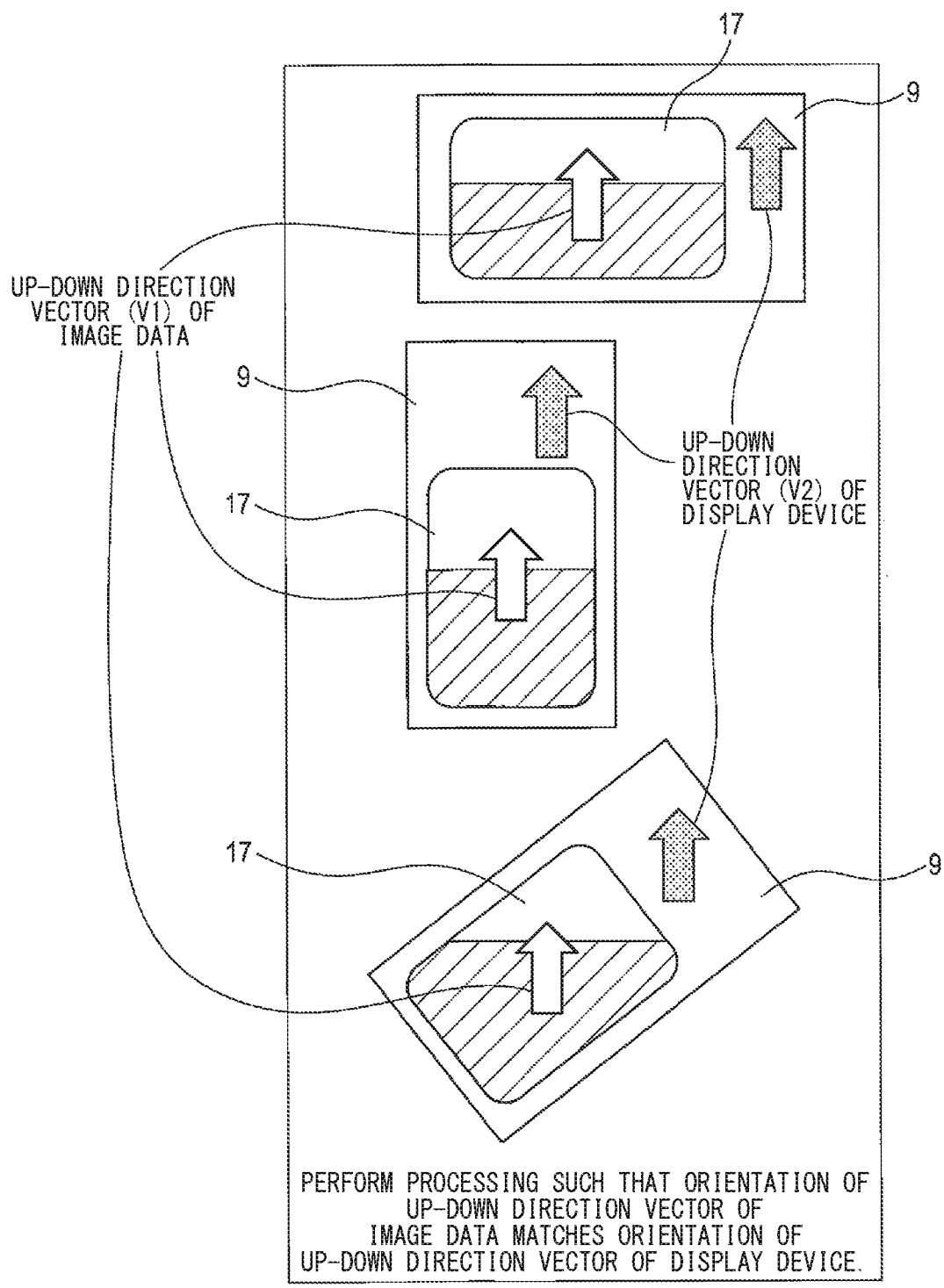
FIG. 15 is an explanatory view illustrating a display method in a display device of the third embodiment.

As a result, the display image, in which the inclination of the photographed image has been corrected and which has a correct up-down direction, is displayed on the display 17 of the display device 9, as illustrated in FIG. 15. That is, the display image, processed such that the up-down direction vector V1 of the image data matches an up-down direction vector V2 of the display device 9 that indicates an orientation in the display device 9 (accordingly, the display 17), is displayed.

Note that the upper view and the middle view in FIG. 15 illustrate a case where the up-down direction of the display 17 matches the vertical direction. The lower view in FIG. 15 illustrates a case where the up-down direction of the display 17 is inclined with respect to the vertical direction, as in the display 17 of a mobile terminal. The inclination of the mobile terminal can be detected by a G sensor or the like.

3-2. Control Processing

Next, control processing in the third embodiment will be described with reference to FIG. 16.

Figure 16:
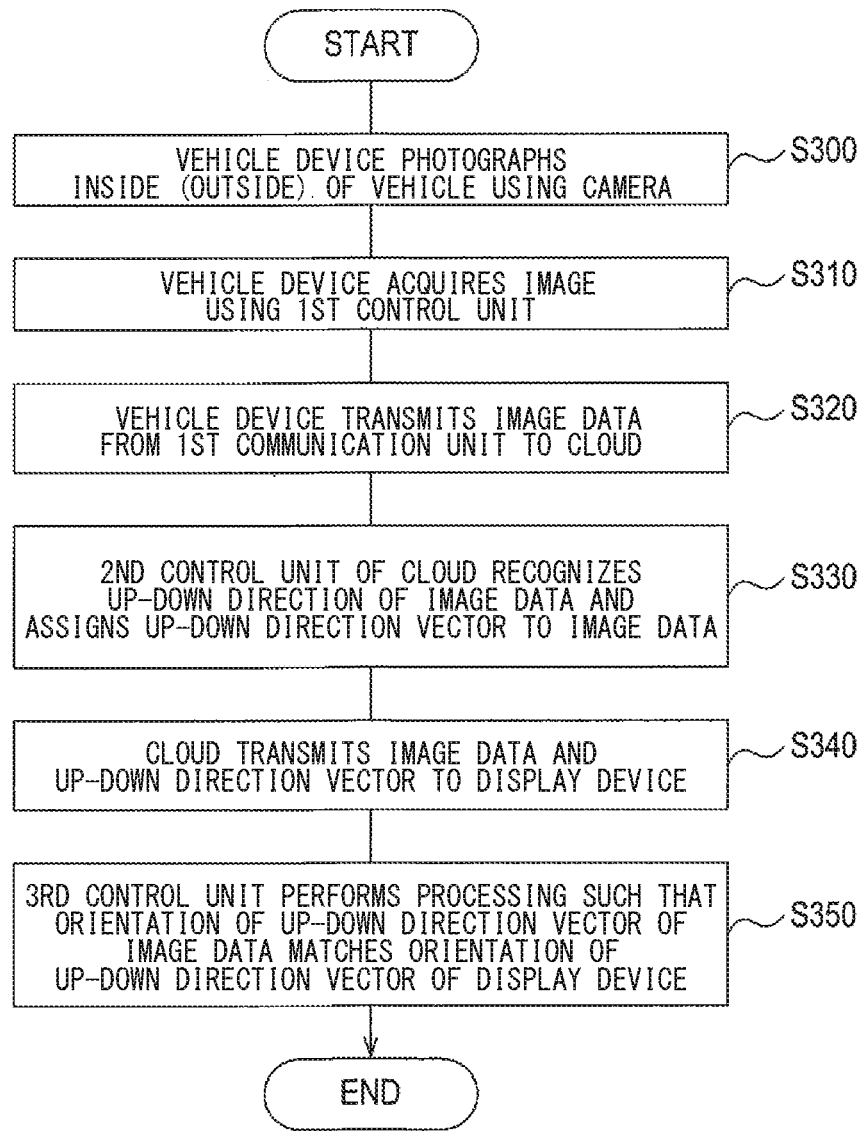
FIG. 16 is a flowchart showing control processing in the image correction system of the third embodiment.

In S300 in FIG. 16, the vehicle device 5 photographs the outside (or the inside) of the vehicle by the camera 19.

In subsequent S310, the vehicle device 5 fetches an image (photographed image) captured by the camera 19 into the first control unit 23.

In subsequent S320, the vehicle device 5 transmits image data on the photographed image from the first communication unit 11 to the cloud 7.

In subsequent S330, the cloud 7 recognizes, in the second control unit 33, the inclination (i.e., up-down direction) of the image data, and assigns the up-down direction vector V1 to the image data.

In subsequent S340, the image data, to which data on the up-down direction vector V1 has been assigned, is transmitted from the cloud 7 to the display device 9.

In subsequent S350, the third control unit 53 of the display device 9 corrects the inclination of the photographed image such that the up-down direction vector V1 of the image data matches the up-down direction vector V2 of the display device 9 (accordingly, the display 17).

As a result, a display image whose up-down direction is correct is generated, and thus this display image is displayed on the display 17, and the present processing is temporarily ended.

In the third embodiment, the same effects as those in the first embodiment are obtained.

4. Fourth Embodiment

Next, a fourth embodiment will be described. Since the basic configuration of the fourth embodiment is similar to that of the first embodiment, differences from the first embodiment will be mainly described below. Note that the same reference numerals as those in the third embodiment indicate the same configurations, and reference is made to the preceding description.

Since the hardware configuration of the image correction system 1 of the fourth embodiment is the same as that of the first embodiment, the description thereof will be omitted.

In the fourth embodiment, the vehicle device 5 performs processing for detecting the inclination of a photographed image to assign a vector, and the display device 9 performs processing for correcting the inclination of the photographed image.

4-1. Procedure of Processing

Figure 17:
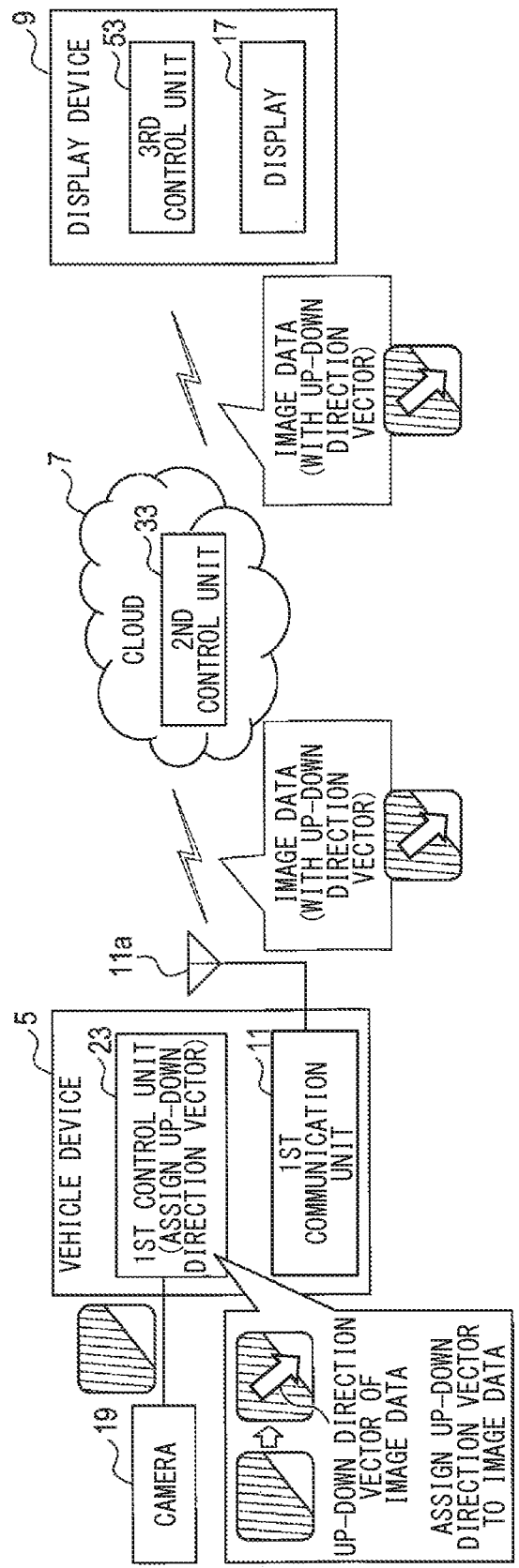
FIG. 17 is an explanatory view illustrating a procedure of processing in an image correction system of a fourth embodiment.

As illustrated in FIG. 17, the outside or inside of the vehicle is photographed by the camera 19. Here, description will be made by taking a photographed image, in which a landscape outside the vehicle is photographed, as an example.

Image data on the photographed image captured by the camera 19 is sent to the first control unit 23 of the vehicle device 5. The first control unit 23 assigns the up-down direction vector V1 to the image data.

Next, the image data, to which data on the up-down direction vector V1 has been assigned, is transmitted from the antenna 11a of the first communication unit 11 to the cloud 7.

Next, the image data, to which data on the up-down direction vector V1 has been assigned, is transmitted from the cloud 7 to the display device 9.

The third control unit 53 corrects the image data on the photographed image on the basis of the up-down direction vector V1, generates a display image whose up-down direction is correct, and displays the image on the display 17.

4-2. Control Processing

Next, control processing in the fourth embodiment will be described with reference to FIG. 18.

Figure 18:
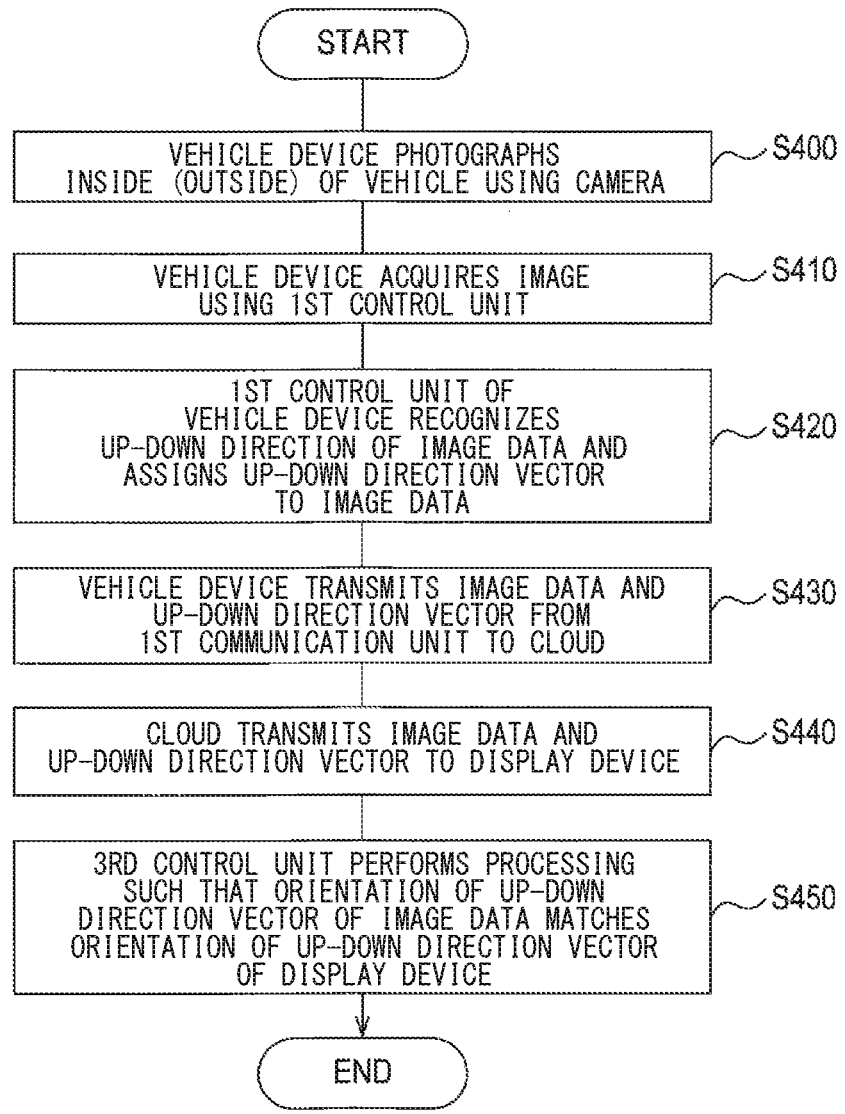
FIG. 18 is a flowchart showing control processing in the image correction system of the fourth embodiment.

In S400 in FIG. 18, the vehicle device 5 photographs the outside (or the inside) of the vehicle by the camera 19.

In subsequent S410, the vehicle device 5 fetches an image (photographed image) captured by the camera 19 into the first control unit 23.

In subsequent S420, the first control unit 23 of the vehicle device 5 recognizes the inclination (i.e., up-down direction) of the image data, and assigns the up-down direction vector V1 to the image data.

In subsequent S430, the vehicle device 5 transmits the image data, to which the data on the up-down direction vector V1 has been assigned, to the cloud 7.

In subsequent S440, the cloud 7 transmits the image data, to which the data on the up-down direction vector V1 has been assigned, to the display device 9.

In subsequent S450, the third control unit 53 of the display device 9 corrects the inclination of the photographed image such that the up-down direction vector V1 of the image data matches the up-down direction vector V2 of the display device 9 (accordingly, the display 17).

As a result, a display image whose up-down direction is correct is generated, and thus this display image is displayed on the display 17, and the present processing is temporarily ended.

In the fourth embodiment, the same effects as those in the third embodiment are obtained.

5. Other Embodiments

Although the embodiments of the present disclosure have been described above, it is needless to say that the present disclosure is not limited to the above embodiments and can take various forms.

(5a) The control process in each embodiment may be always performed after the vehicle is started. When correction is performed based on a photographed image in which the inside of the vehicle is photographed, the control processing may be performed at least once after the vehicle is started.

(5b) In a case where there are a plurality of cameras (e.g., cameras for photographing the inside of a vehicle), the above-described inclination may be detected based on a photographed image captured by a certain camera, and the above-described correction may be performed based on a photographed image captured by another camera.

For example, in a case where: there are a camera A that photographs the second row in the vehicle and a camera B that photographs the third row; and it is known that the camera A and the camera B are attached, in the same posture, to the ceiling perpendicular to the up-down direction of the vehicle, inclination correction for the camera B is performed based on correction information for the camera A, and correction detection, based on the image by the camera B itself, is not performed. As a result, as compared with a case where inclination correction is performed by each of the camera A and the camera B, a processing load to the control unit can be reduced.

(5c) As described above, examples of the display device provided with a display include a personal computer and a mobile terminal used outside a vehicle by an operator of business, such as car sharing, or by an individual, but examples thereof may include a display device disposed on the dashboard or the like inside a vehicle. Also in such a display device, it is possible to display, for example, a display image whose up-down direction is correct, so that it is friendly to a driver and the like because there is less sense of discomfort.

(5d) The cloud or at least a part of the cloud may be provided by on-premise software. For example, a cloud server or an on-premise server may be adopted as the external device (i.e., disposed outside of the vehicle). In addition, the cloud may be a hybrid cloud combining a public cloud, a private cloud, an on-premise, and the like.

For example, at least a part of the cloud in each embodiment may be managed and operated by equipment such as a server outside the vehicle prepared by a company that provides the vehicle or the vehicle device.

(5e) The image correction system described in the present disclosure may be implemented by a dedicated computer provided by configuring a processor and a memory programmed to execute one or more functions embodied by a computer program.

Alternatively, the image correction system described in the present disclosure may be implemented by a dedicated computer provided by configuring a processor by one or more dedicated hardware logic circuits.

Alternatively, the image correction system described in the present disclosure may be implemented by one or more dedicated computers configured by a combination of a processor and a memory programmed to execute one or more functions, and a processor configured by one or more hardware logic circuits.

In addition, the computer program may be stored in a computer-readable non-transitory tangible recording medium as an instruction executed by a computer. The method for implementing the functions of the respective units included in the image correction system does not necessarily include software, and all the functions may be implemented using one or more hardware components or hardware circuits.

(5f) The present disclosure can be implemented in various forms such as a program for controlling the computer of the image correction system to function, a non-transitory tangible recording medium such as a semiconductor memory that records this program, and a control method (i.e., an image correction method), in addition to the above-described image correction system.

(5g) The multiple functions of one component in the above embodiments may be implemented by multiple components, or a function of one component may be implemented by multiple components. Multiple functions of multiple components may be implemented by one component, or a single function implemented by multiple components may be provided by one component. A part of the configuration of the above embodiments may be omitted as appropriate. At least partial configuration of one embodiment may be added to or replaced with the corresponding configuration of another embodiment.

What is claimed is:

1. An image correction system, which is capable of transmitting data indicating an image captured by a camera to a display device via a vehicle device and an external device, the camera and the vehicle device being mounted to a vehicle and the external device being disposed outside the vehicle, the image correction system comprising:

an inclination detection unit detecting, with respect to a predetermined orientation, an inclination of a photographed image that indicates the image captured by the camera; and a correction processing unit performing a correction by correcting the inclination of the photographed image, which is detected by the inclination detection unit, to a target orientation and generating a display image to be displayed on the display device, the inclination detection unit detects the inclination of the photographed image (i) based on the photographed image which includes structural objects or markers disposed in the vehicle such that a left-right direction or an up-down direction of the vehicle can be recognized or (ii) based on a left-right direction or an up-down direction of an object included in the photographed image capturing a landscape outside the vehicle by performing image recognition to the photographed image, and the image correction system corrects the inclination of the photographed image by using the photographed image itself without using a sensor that detects an inclination of the vehicle.

2. The image correction system according to claim 1, wherein in a case where a plurality of the cameras are mounted to the vehicle, the correction is performed to the photographed image captured by one of the plurality of the cameras, based on the photographed image captured by another one of the plurality of the cameras.

3. The image correction system according to claim 1, wherein the inclination detection unit and the correction processing unit are provided in the vehicle device, which is mounted to the vehicle.

4. The image correction system according to claim 3, wherein the display device displays the display image based on data of the display image transmitted from the external device.

5. The image correction system according to claim 1, wherein the inclination detection unit and the correction processing unit are provided in the external device.

6. The image correction system according to claim 1, wherein the vehicle device mounted to the vehicle performs a processing executed by the inclination detection unit, and the vehicle device assigns inclination data indicating the detected inclination of the photographed image to data of the photographed image.

7. The image correction system according to claim 6, wherein the display device generates the display image based on the data of the photographed image and the inclination data, which are transmitted from the external device, and displays the generated display image.

8. The image correction system according to claim 1, wherein the external device performs a processing executed by the inclination detection unit, and the external device assigns inclination data indicating the detected inclination of the photographed image to data of the photographed image.

9. The image correction system according to claim 1, wherein each of the inclination detection unit and the correction processing unit is activated to start corresponding operation when the vehicle is started.

10. The image correction system according to claim 1, wherein
after the vehicle is started, each of the inclination detection unit and the correction processing unit maintains an operating state.

11. The image correction system according to claim 1, wherein
after the vehicle is started, the correction is performed at least once based on the photographed image in which an inside of the vehicle is photographed.

12. The image correction system according to claim 1, wherein
the inclination detection unit detects the inclination of the photographed image based on the photographed image which includes structural objects or markers disposed in the vehicle such that the left-right direction or the up-down direction of the vehicle can be recognized.

13. The image correction system according to claim 1, wherein
the inclination detection unit detects the inclination of the photographed image based on the left-right direction or the up-down direction of the object included in the photographed image capturing the landscape outside the vehicle by performing image recognition to the photographed image.

14. A vehicle device mounted to a vehicle, the vehicle being mounted with a camera, the vehicle device comprising:
a computer-readable non-transitory storage medium; and
a computer, by executing a program stored in the computer-readable non-transitory storage, configured to:
detect, with respect to a predetermined orientation, an inclination of a photographed image that indicates an image captured by the camera;
generate a display image to be displayed on a display device by correcting the detected inclination of the photographed image to a target orientation; and
transmit, to an external device disposed outside the vehicle, the generated display image to be displayed on the display device, wherein
detecting the inclination of the photographed image is (i) based on the photographed image which includes structural objects or markers disposed in the vehicle such that a left-right direction or an up-down direction of the vehicle can be recognized or (ii) based on a left-right direction or an up-down direction of an object included in the photographed image capturing a landscape outside the vehicle by performing image recognition to the photographed image, and
the inclination of the photographed image is corrected by using the photographed image itself without using a sensor that detects an inclination of the vehicle.

15. The vehicle device according to claim 14, wherein
the vehicle is mounted with a plurality of the cameras, and
the computer corrects the photographed image captured by one of the plurality of the cameras, based on the photographed image captured by another one of the plurality of the cameras.

16. The vehicle device according to claim 14, wherein
detecting the inclination of the photographed image is based on the photographed image which includes structural objects or markers disposed in the vehicle such that the left-right direction or the up-down direction of the vehicle can be recognized.

17. The vehicle device according to claim 14, wherein
detecting the inclination of the photographed image is based on the left-right direction or the up-down direction of the object included in the photographed image capturing the landscape outside the vehicle by performing image recognition to the photographed image.

18. A server device disposed outside of a vehicle and communicating with a vehicle device mounted to the vehicle, the server device comprising:
a computer-readable non-transitory storage medium; and
a computer, by executing a program stored in the computer-readable non-transitory storage, configured to:
receive, from the vehicle device, a photographed image captured by a camera mounted on the vehicle;
detect, with respect to a predetermined orientation, an inclination of the photographed image;
generate a display image to be displayed on a display device by correcting the detected inclination of the photographed image to a target orientation; and
transmit the generated display image to the display device, wherein
detecting the inclination of the photographed image is (i) based on the photographed image which includes structural objects or markers disposed in the vehicle such that a left-right direction or an up-down direction of the vehicle can be recognized or (ii) based on a left-right direction or an up-down direction of an object included in the photographed image capturing a landscape outside the vehicle by performing image recognition to the photographed image, and
the inclination of the photographed image is corrected by using the photographed image itself without using a sensor that detects an inclination of the vehicle.

19. The server device according to claim 18, wherein
detecting the inclination of the photographed image is based on the photographed image which includes structural objects or markers disposed in the vehicle such that the left-right direction or the up-down direction of the vehicle can be recognized.

20. The server device according to claim 18, wherein
detecting the inclination of the photographed image is based on the left-right direction or the up-down direction of the object included in the photographed image capturing the landscape outside the vehicle by performing image recognition to the photographed image.

21. An image correction system, which is capable of transmitting data indicating an image captured by a camera to a display device via a vehicle device and an external device, the camera and the vehicle device being mounted to a vehicle and the external device being disposed outside the vehicle,
the image correction system comprising:
an inclination detection unit detecting, with respect to a predetermined orientation, an inclination of a photographed image that indicates the image captured by the camera; and
a correction processing unit performing a correction by correcting the inclination of the photographed image, which is detected by the inclination detection unit, to a target orientation and generating a display image to be displayed on the display device,
the inclination detection unit detects the inclination of the photographed image based on the photographed image which includes structural objects or markers disposed in the vehicle such that a left-right direction or an up-down direction of the vehicle can be recognized.

22. A vehicle device mounted to a vehicle, the vehicle being mounted with a camera, the vehicle device comprising:
- a computer-readable non-transitory storage medium; and
- a computer, by executing a program stored in the computer-readable non-transitory storage, configured to:
  - detect, with respect to a predetermined orientation, an inclination of a photographed image that indicates an image captured by the camera;
  - generate a display image to be displayed on a display device by correcting the detected inclination of the photographed image to a target orientation; and
  - transmit, to an external device disposed outside the vehicle, the generated display image to be displayed on the display device, wherein
- detecting the inclination of the photographed image is based on the photographed image which includes structural objects or markers disposed in the vehicle such that a left-right direction or an up-down direction of the vehicle can be recognized.

23. A server device disposed outside of a vehicle and communicating with a vehicle device mounted to the vehicle, the server device comprising:
- a computer-readable non-transitory storage medium; and
- a computer, by executing a program stored in the computer-readable non-transitory storage, configured to:
  - receive, from the vehicle device, a photographed image captured by a camera mounted on the vehicle;
  - detect, with respect to a predetermined orientation, an inclination of the photographed image;
  - generate a display image to be displayed on a display device by correcting the detected inclination of the photographed image to a target orientation; and
  - transmit the generated display image to the display device, wherein
- detecting the inclination of the photographed image is based on the photographed image which includes structural objects or markers disposed in the vehicle such that a left-right direction or an up-down direction of the vehicle can be recognized.

* * * * *